(12) United States Patent
Futami et al.

(10) Patent No.: US 10,754,306 B2
(45) Date of Patent: Aug. 25, 2020

(54) POSITION CONTROL APPARATUS AND METHOD

(71) Applicant: THK CO., LTD., Tokyo (JP)

(72) Inventors: Shigeru Futami, Tokyo (JP); Hitoshi Shibata, Tokyo (JP); Tomofumi Ohashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 142 days.

(21) Appl. No.: 15/747,515

(22) PCT Filed: Jul. 28, 2016

(86) PCT No.: PCT/JP2016/072136
§ 371 (c)(1),
(2) Date: Jan. 25, 2018

(87) PCT Pub. No.: WO2017/022612
PCT Pub. Date: Feb. 9, 2017

(65) Prior Publication Data
US 2018/0217564 A1 Aug. 2, 2018

(30) Foreign Application Priority Data

Aug. 6, 2015 (JP) .................................. 2015-155719
Jan. 21, 2016 (JP) .................................. 2016-009483
(Continued)

(51) Int. Cl.
*G05B 11/42* (2006.01)
*G05B 11/36* (2006.01)
(Continued)

(52) U.S. Cl.
CPC .............. *G05B 11/42* (2013.01); *G05B 11/36* (2013.01); *G05B 19/19* (2013.01); *G05B 19/402* (2013.01); *G05B 19/404* (2013.01); *G05D 3/20* (2013.01)

(58) Field of Classification Search
None
See application file for complete search history.

(56) References Cited

U.S. PATENT DOCUMENTS 6,515,442 B1   2/2003   Okubo et al.
8,961,533 B2   2/2015   Stahler et al.
(Continued)

FOREIGN PATENT DOCUMENTS

CN   1322311 A   11/2001
CN   101834554 A   9/2010
(Continued)

OTHER PUBLICATIONS

Sugie et al., "Modeling and Compensation for the Exponential Type Lost Motion to Improve the Contouring Accuracy of NC Machine Tools", Systems, Control and Information, vol. 45, No. 3, Apr. 2, 2001, vol. 14, pp. 25-31. (7 pages).
(Continued)

*Primary Examiner* — Mohammad Ali
*Assistant Examiner* — Saad M Kabir
(74) *Attorney, Agent, or Firm* — Westerman, Hattori, Daniels & Adrian, LLP

(57) ABSTRACT

A new position control apparatus is provided which can reduce deviation caused by a non-linear spring characteristic of a rolling apparatus. In a position control apparatus (5) that controls the position of a movable body (1), in a positioning apparatus (9) including a rolling apparatus (2), a deviation e(t) or d of the movable body 1 caused by the non-linear spring characteristic of the rolling apparatus (2) is subtracted from or added to a position command Xref or r of the movable body (1). The deviation d is calculated by carrying out equivalent exchange on a control circuit for a friction force of the rolling apparatus (2), which is set as a quantity of the dimension of displacement.

20 Claims, 38 Drawing Sheets

(30) Foreign Application Priority Data

Mar. 11, 2016 (JP) ................................ 2016-048577
Jun. 10, 2016 (JP) ................................ 2016-116365

(51) Int. Cl.
    *G05B 19/19*     (2006.01)
    *G05B 19/402*     (2006.01)
    *G05B 19/404*     (2006.01)
    *G05D 3/20*     (2006.01)

(56) References Cited

U.S. PATENT DOCUMENTS

| | | |
|---|---|---|
| 2009/0033271 A1 | 2/2009 | Hon et al. |
| 2009/0304312 A1* | 12/2009 | Horie ................ B25J 19/0062 384/13 |
| 2010/0302526 A1 | 12/2010 | Saiki |
| 2011/0246132 A1 | 10/2011 | Sato et al. |
| 2012/0194121 A1 | 8/2012 | Miyaji |
| 2012/0296471 A1 | 11/2012 | Inaba et al. |
| 2013/0282192 A1 | 10/2013 | Futami |
| 2014/0202018 A1* | 7/2014 | Barkman ................ G01B 5/24 33/645 |

FOREIGN PATENT DOCUMENTS

| | | |
|---|---|---|
| CN | 102245349 A | 11/2011 |
| CN | 102621990 A | 8/2012 |
| CN | 103270694 A | 8/2013 |
| CN | 102890000 B | 2/2015 |
| CN | 102785046 B | 5/2015 |
| JP | 2007-58277 A | 3/2007 |
| JP | 2008-299488 A | 12/2008 |
| JP | 2009-34738 A | 2/2009 |
| JP | 2013-102663 A | 5/2013 |
| TW | 200943318 A | 10/2009 |
| TW | I330774 B | 9/2010 |
| WO | 2009/110599 A1 | 9/2009 |

OTHER PUBLICATIONS

International Search Report dated Sep. 6, 2016, issued in counterpart International Application No. PCT/JP2016/072136 (1 page).
Office Action dated May 3, 2019, issued in counterpart TW Application No. 105124937 (7 pages).
Office Action dated Apr. 28, 2020, issued in counterpart CN Application No. 201680042324.9, with English translation (11 pages).

* cited by examiner

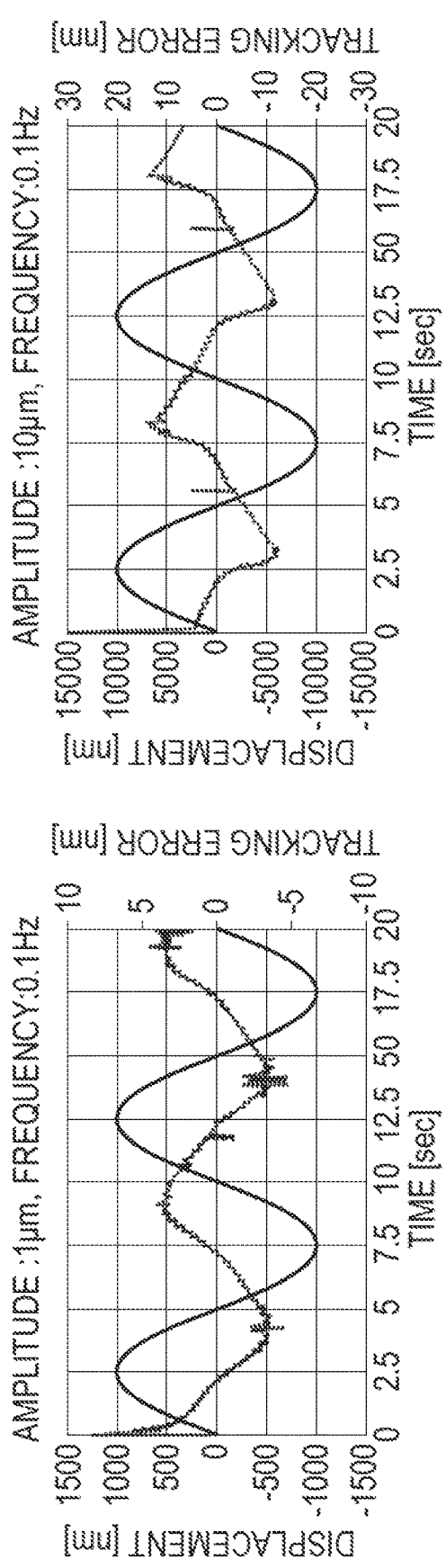
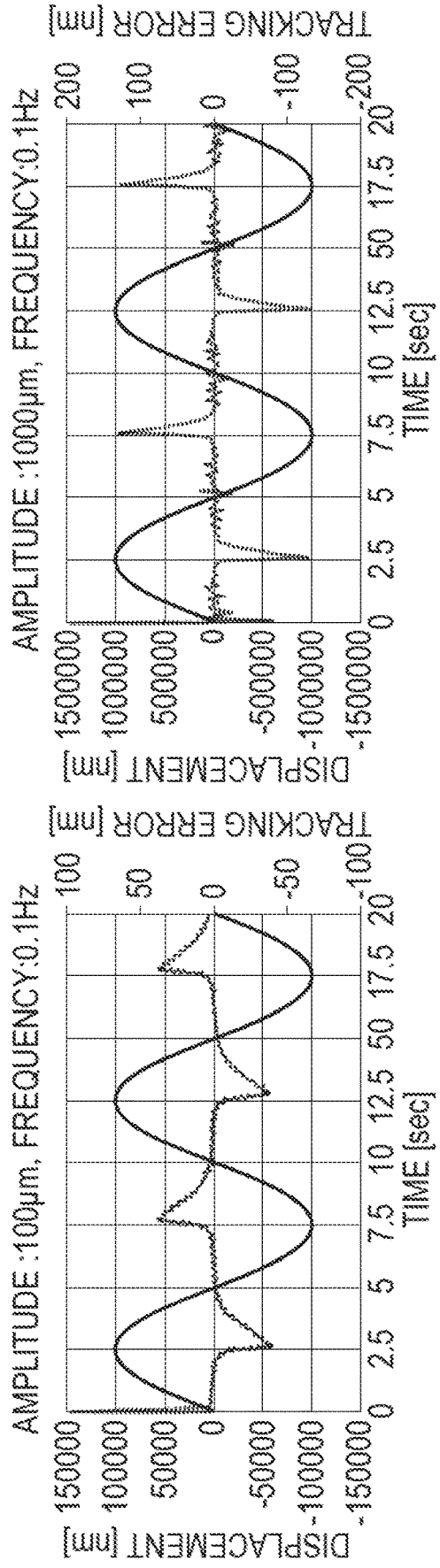

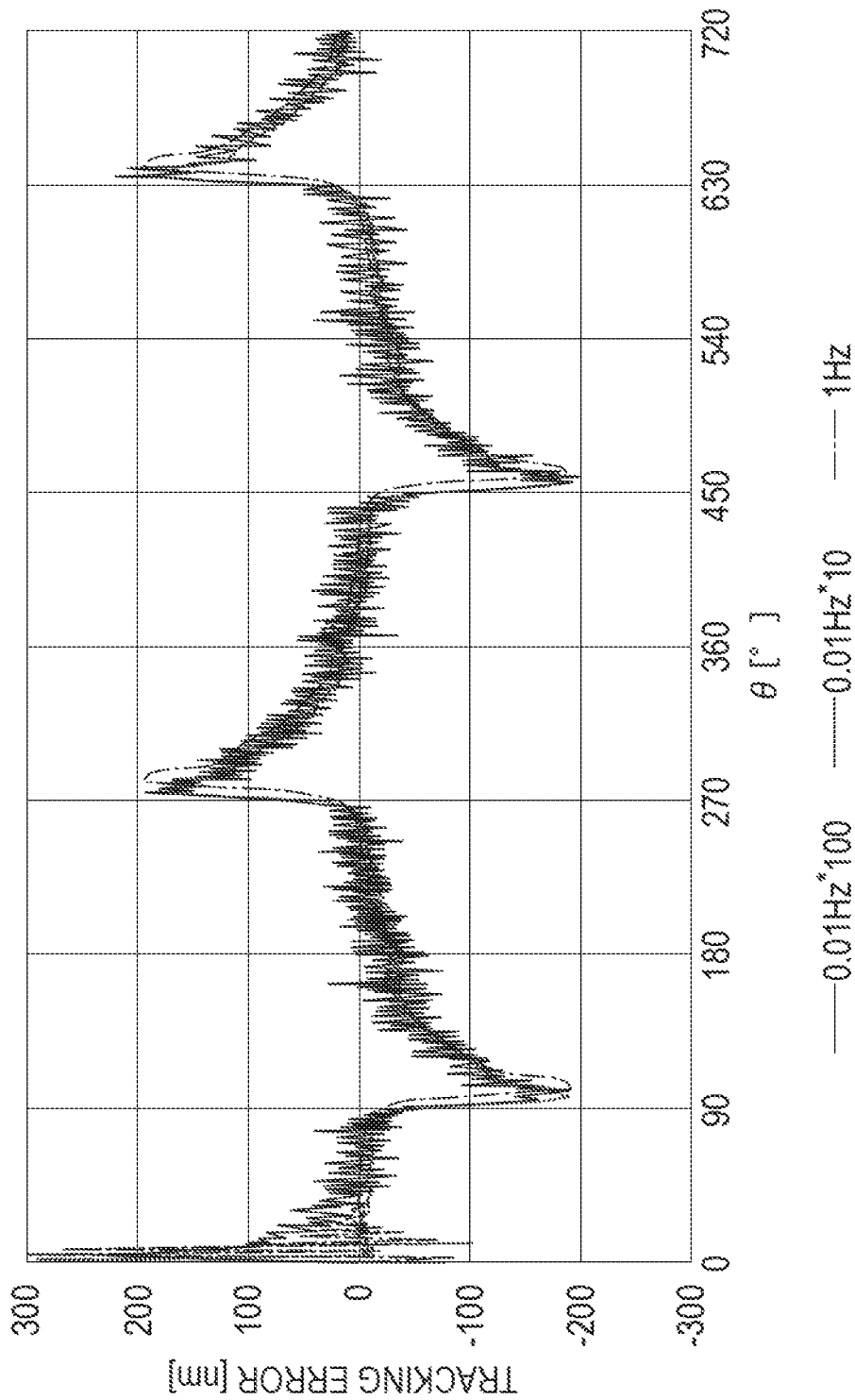

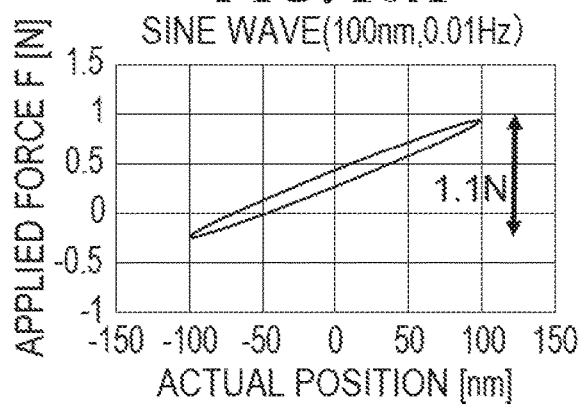
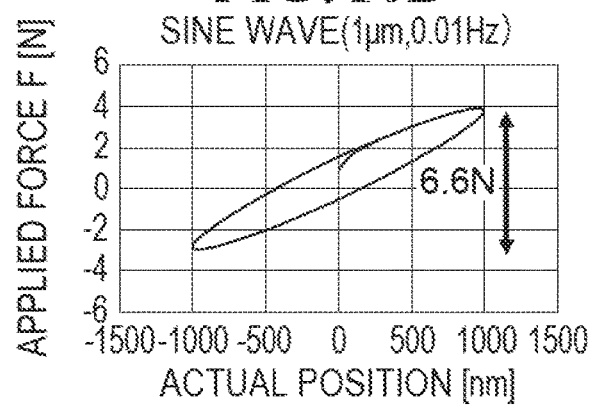
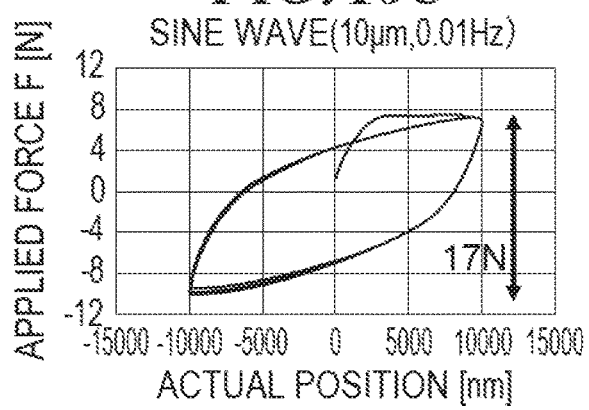
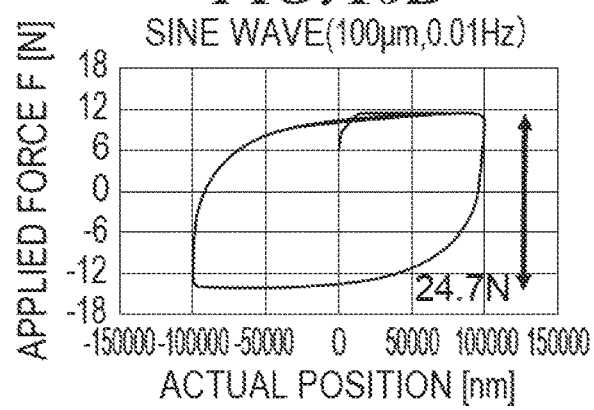
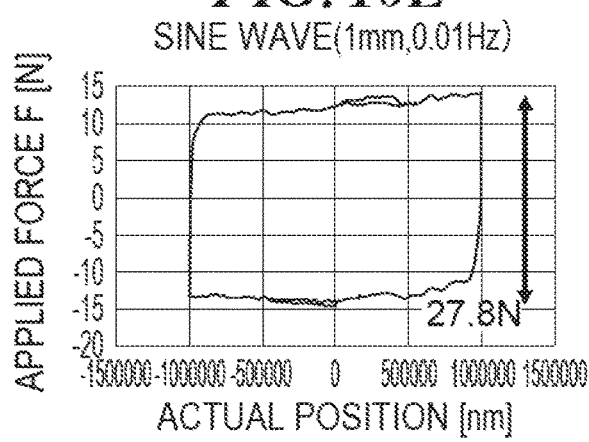

FIG. 11

DATA TABLES[0]~[4000]

| | [0] | [1] | [2] | [3] | [4] | | [998] | [999] |
|---|---|---|---|---|---|---|---|---|
| | [1000] | [1001] | [1002] | [1003] | [1004] | | [1998] | [1999] |
| | [2000] | [2001] | [2002] | [2003] | [2004] | | [2998] | [2999] |
| | [3000] | [3001] | [3002] | [3003] | [3004] | | [3998] | [3999] |
| | [4000] | | | | | | | |

POSITION CONTROL APPARATUS AND METHOD

TECHNICAL FIELD

The present invention relates to a position control apparatus and method that controls the position of a movable body in a positioning apparatus including a rolling apparatus.

BACKGROUND ART

Precise positioning is a basic and important technology. Leading-edge technical fields including semiconductor manufacturing, liquid crystal manufacturing, and processing of optoelectronic devices require precise positioning apparatuses with high resolution.

Those including a combination of a linear motor and a static pressure guide are known as the precise positioning apparatuses. The static pressure guide supplies pressurized air, and floats a movable body to guide the movable body by using low viscosity of the air. Friction is hard to act on the guide. Accordingly, the static pressure guide is suitable for precise positioning. However, there are problems that the rigidity of the guide is low and the guide is sensitive to disturbances.

In recent years, instead of the static pressure guide, a rolling guide apparatus using a spherical or cylindrical rolling element has started being used. Reasons of this include an improvement in performance of a commercial rolling guide apparatus, and higher rigidity of the guide than the static pressure guide.

When a force is applied to a guide block of the rolling guide apparatus, the relationship between the applied force and a displacement caused generates hysteresis and exhibits non-linearity. The characteristic exhibiting non-linearity is called a non-linear spring characteristic, which is known to be present in a minute displacement region of several tens μm or below. The non-linear spring characteristic appears before the rolling element in the guide block starts rolling or when the rolling element reverses its rolling direction, and adversely affects the accuracy of precise positioning. For example, when arc motion is performed on a two-axis, X and Y, stage using the rolling guide apparatus, and an error between a target command position and an actual position is enlarged, a spike-like error (a quadrant glitch) occurs at quadrant changes. It is hard to eliminate the quadrant glitch even by using closed-loop control that feeds back the position of a table. Therefore, when the rolling guide apparatus is used, the handling of the non-linear spring characteristic is an important issue.

As how to handle the non-linear spring characteristic, Patent Literature 1 discloses an invention that, in a position control apparatus of a table that is guided by the rolling guide apparatus, obtains a friction force from the non-linear spring characteristic of a rolling guide apparatus on the basis of the velocity of the table and corrects the thrust of the table with the obtained friction force. In other words, the invention described in Patent Literature 1 assumes that the non-linear spring characteristic is one of friction characteristics and a friction force obtained from the non-linear spring characteristic is a disturbance of thrust.

CITATION LIST

Patent Literature

Patent Literature 1: JP 2008-299488 A

SUMMARY OF INVENTION

Technical Problem

However, even if the invention described in Patent Literature 1 is used, deviation caused by the non-linear spring characteristic of the rolling guide apparatus cannot be completely eliminated. Moreover, there are also problems that an equation to obtain the friction force from the non-linear spring characteristic is very complex, and that the processing of a servo takes time.

Hence, an object of the present invention is to provide a new position control apparatus that can reduce deviation caused by the non-linear spring characteristic of a rolling apparatus.

Solution to Problem

The present invention is a position control apparatus that controls the position of a movable body, in a positioning apparatus including a rolling apparatus, wherein a deviation of the movable body caused by a non-linear spring characteristic of the rolling apparatus is subtracted from or added to a position command of the movable body.

In the present invention, the rolling apparatus is an apparatus where rolling elements are interposed in a manner capable of rolling motion between a first member and a second member. The rolling apparatus is, for example, a rolling guide apparatus or a ball screw.

Advantageous Effects of Invention

The generation of a friction force on the rolling apparatus and the generation of a position error (deviation) on a movable body arise from the non-linear spring characteristic of the rolling apparatus. The present invention does not subtract or add a friction force caused by the non-linear spring characteristic of the rolling apparatus from or to a thrust command, but subtracts or adds a deviation of the movable body from or to a position command. According to the present invention, the position command of the movable body is corrected with a displacement signal with much higher control accuracy than the force, which enables a more accurate correction and also makes a configuration for correction simpler.

BRIEF DESCRIPTION OF DRAWINGS

FIGS. 5A to 5D are graphs illustrating error shapes at the time when the radius of a circle was changed while the frequency was maintained constant (FIG. 5A is an illustration with an amplitude of 1 μm, FIG. 5B an illustration with an amplitude of 10 μm, FIG. 5C an illustration with an amplitude of 100 μm, and FIG. 5D an illustration with an amplitude of 1000 μm).

FIG. 7 is a graph illustrating the three superimposed error shapes of FIGS. 6A to 6C.

FIG. 10A to FIG. 10E are graphs illustrating a non-linear spring characteristic (FIG. 10A is an illustration with an amplitude of 100 nm, FIG. 10B an illustration with an amplitude of 1 μm, FIG. 10C an illustration with an amplitude of 10 μm, FIG. 10D an illustration with an amplitude of 100 μm, and FIG. 10E an illustration with an amplitude of 1 mm).

FIG. 11 is a diagram illustrating an example of data tables.

BEST MODE FOR CARRYING OUT THE INVENTION

A position control apparatus of embodiments of the present invention is described in detail hereinafter on the basis of the accompanying drawings. However, the position control apparatus of the present invention can be embodied in various modes, and is not limited to the embodiments described in the present description. The embodiments are provided with the intention of enabling those skilled in the art to fully understand the scope of the invention by fully disclosing the description.

First Embodiment

Figure 1:
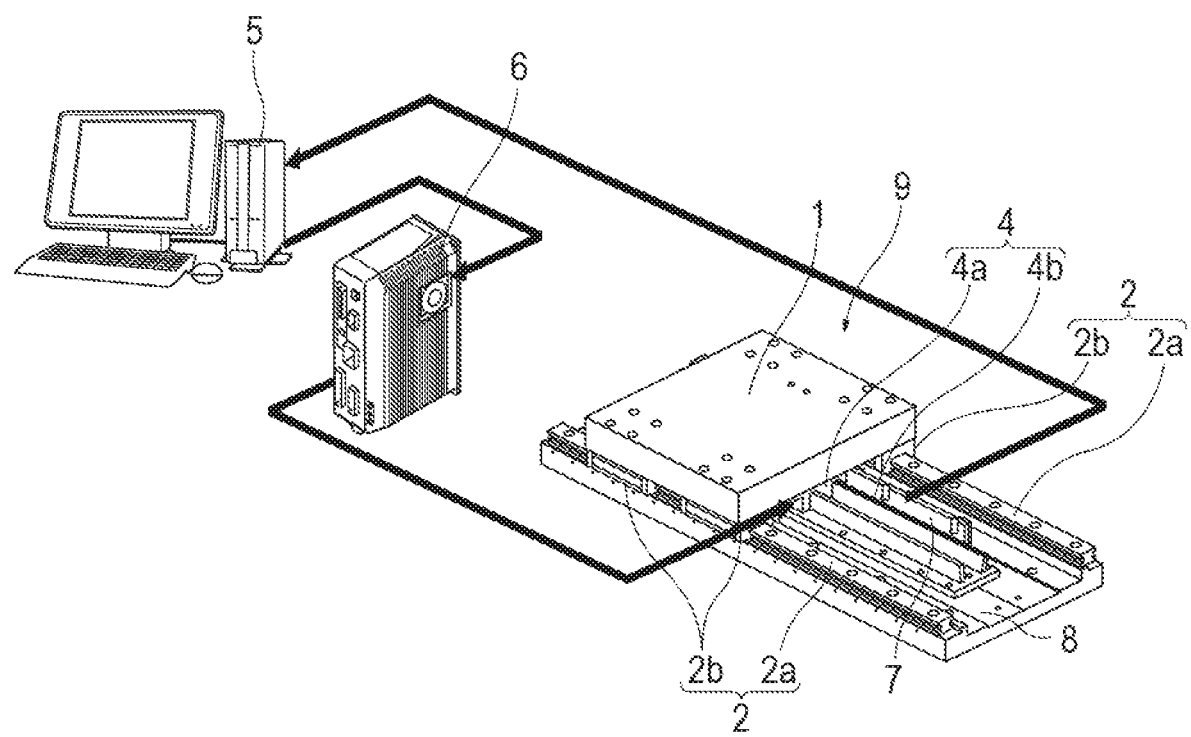
FIG. 1 is an external perspective view of a stage in which a position control apparatus of a first embodiment of the present invention is integrated.

FIG. 1 is an external perspective view of a stage 9 as a positioning apparatus in which a position control apparatus of a first embodiment of the present invention is integrated. The stage 9 includes a combination of linear ball guides 2 as rolling apparatuses (rolling guide apparatuses) and a linear motor 4. In FIG. 1, a reference numeral 8 denotes a base, a reference numeral 4 the linear motor, a reference numeral 2 the linear ball guide, and a reference numeral 1 a table. The table 1 as a movable body is guided in an axis direction by the linear ball guide 2, and is driven in the axis direction by the linear motor 4.

A stator 4b including a permanent magnet is attached to the center on the upper side of the base 8. An armature 4a facing the stator 4b is attached to the center on the underside of the table 1. The stator 4b and the armature 4a configure the linear motor 4.

The linear ball guide 2 is placed on either side of the base 8. The linear ball guide 2 includes a rail 2a attached to the upper side of the base 8, and a guide block 2b attached to the underside of the table 1. The guide block 2b is capable of linear motion along the rail 2a. The linear motion of the table 1 is guided by the linear ball guides 2.

In FIG. 1, a reference numeral 5 denotes a computer having a servo control function, a reference numeral 6 an amplifier (amp) that supplies electric power to the armature 4a of the linear motor 4, and a reference numeral 7 a linear encoder that detects the position of the table 1. These computer 5 and amplifier 6 configure the position control apparatus. The electric power is supplied from the amplifier 6 to the armature 4a to reciprocate the table 1 in the axis direction. The position of the table 1 is measured by the linear encoder 7. The measured value is input into the computer 5.

Figure 2:
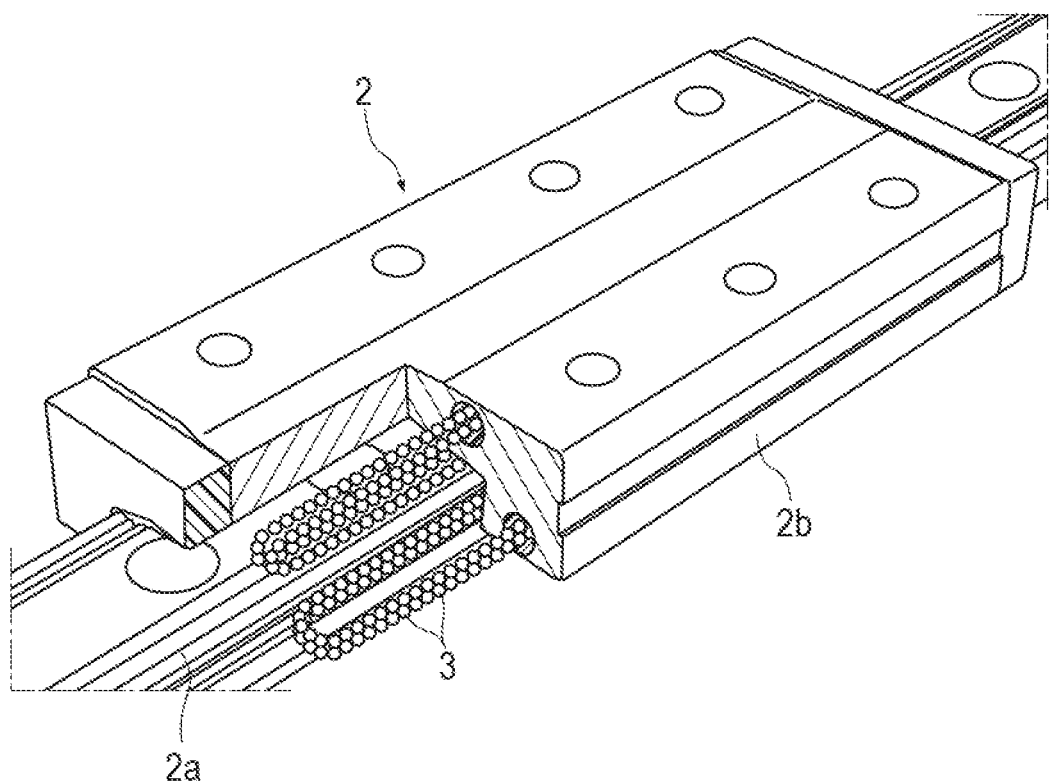
FIG. 2 is a perspective view (including a partial cross-sectional view) of a linear ball guide.

FIG. 2 illustrates a perspective view (including a partial cross-sectional view) of the linear ball guide 2. The linear ball guide 2 of the embodiment is an eight-row linear ball guide 2 including the rail 2a as a first member attached to the base 8, and the guide block 2b as a second member assemble to the rail 2a via balls 3 as rolling elements. When the guide block 2b moves relatively along the rail 2a, the balls 3 between the guide block 2b and the rail 2a performs rolling motion. The eight-row linear ball guide 2 is reduced in ball diameter to improve waving performance, and is increased in the number of rows of raceways from four, which is general, to eight (FIG. 2 illustrates only four rows on one side of the guide block 2b) to compensate for a reduction in rated load. FIG. 2 illustrates a full ball 3. However, a plurality of the balls 3 is actually held in a chain by a retainer.

<Block Diagram Based on Displacement Disturbance Theory (A Theory that Assumes that a Deformation $\delta(x)$ Caused by the Non-Linear Spring Characteristic of the Linear Ball Guide 2 is Additively Added to the Position (Position Control System Output y) of the Table 1)>

Figure 3:
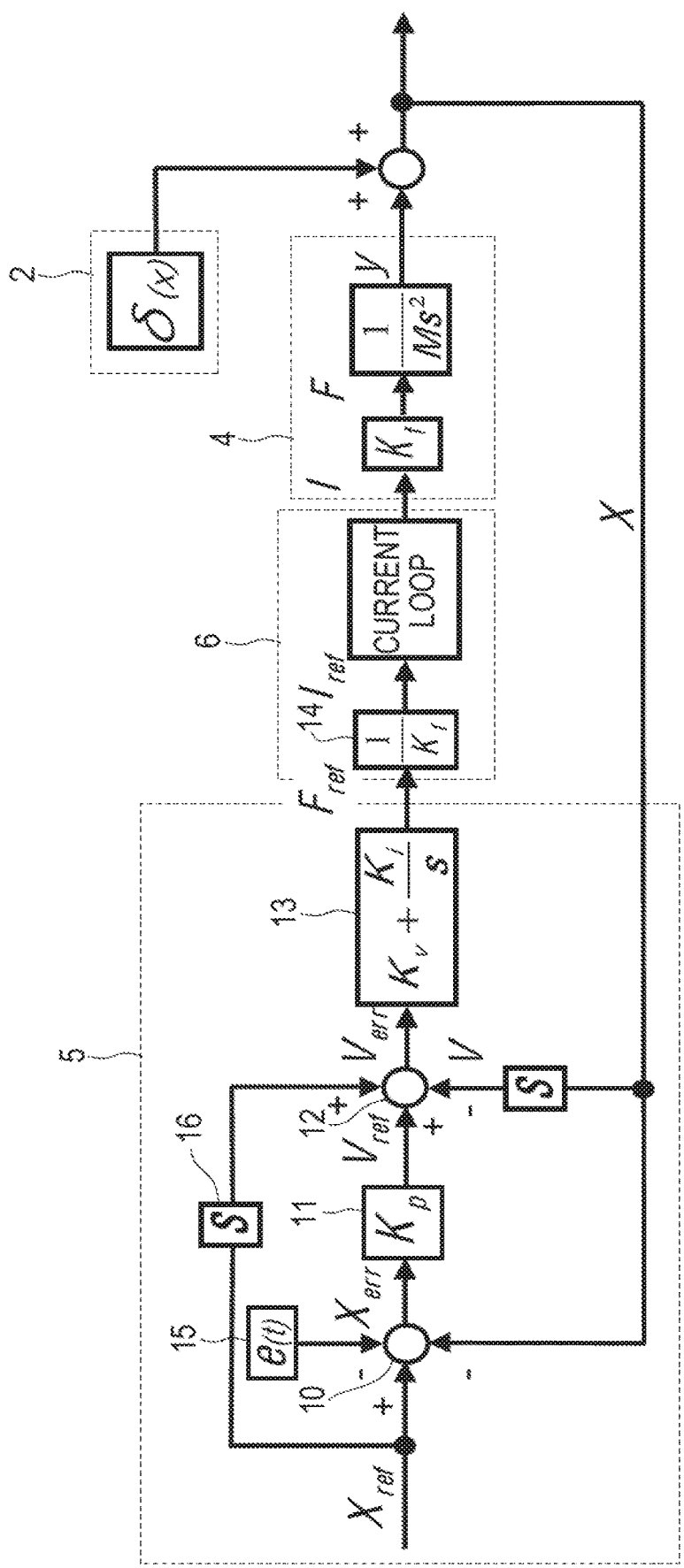
FIG. 3 is a control block diagram of the position control apparatus of the embodiment (a block diagram based on a displacement disturbance theory).

FIG. 3 illustrates a control block diagram of the position control apparatus of the embodiment. As illustrated in FIG. 3, a position command Xref goes through a position controller 11 and a speed controller 13 to generate a thrust command Fref. The amplifier 6 as a current controller supplies electric current to the linear motor 4 on the basis of a current command Iref to move the table 1 via the linear ball guide 2.

A position X of the table 1 is measured by the linear encoder 7. The measured value is input into a subtractor 10. The subtractor 10 calculates a deviation Xerr of the actual position X from the position command Xref. The deviation Xerr is input into the position controller 11. The position controller 11 performs proportional control on position, and outputs a velocity command Vref on the basis of the product of the deviation Xerr and Kp. Kp of FIG. 3 is the position loop gain. The position command Xref is differentiated by a differential circuit 16 and feeds forward velocity to prevent a delay from occurring in a control system.

The velocity command Vref of the table 1 is input into a subtracter 12. An actual velocity V obtained by inputting the actual position X of the table 1 into the differential circuit 16 is also input into the subtractor 12. The subtracter 12 calculates a velocity deviation Verr of the actual velocity V from the velocity command Vref. The velocity deviation Verr is input into the speed controller 13. The speed controller 13 performs proportional-integral control on velocity, and outputs the thrust command Fref on the basis of the velocity deviation Verr. In FIG. 3, Kv is the velocity loop gain, and Ki is the velocity integral gain. A thrust-current constant unit 14 of the amplifier 6 multiplies the thrust command Fref by an inverse 1/Kf of a thrust-current constant, and outputs the current command Iref. The amplifier 6 supplies a current I to the linear motor 4 on the basis of the current command Iref. When the current I is supplied to the linear motor 4, a force F acts on the table 1 to move the table 1. In FIG. 3, M is the mass of the movable body including the table 1, and s is the Laplace operator.

The computer 5 configure the subtracter 10, the position controller 11, the subtracter 12, the differential circuit 16, and the speed controller 13.

In the block diagram of the embodiment, it is assumed that the deformation $\delta(x)$ ($\delta$: the amount of deformation and x: position) of the linear ball guide 2 caused by the non-linear spring characteristic of the linear ball guide 2 is additively added as a disturbance to the position (the position control system output y) of the table 1 (a displacement disturbance theory). This is based on an idea that a force occurs on the linear ball guide 2 due to the non-linear spring characteristic of the linear ball guide 2, and the linear ball guide 2 is deformed by the force (typically, the elastic deformation and slip of the ball 3 occur). The non-linear spring characteristic is described below. The actual position X of the table 1 is obtained by adding the deformation $\delta(x)$ of the linear ball guide 2 to the position control system output y of the table 1.

The deformation $\delta(x)$ of the linear ball guide 2 is quantitatively grasped to correct the position command Xref of the table 1. Accordingly, the deviation caused by the linear ball guide 2 can be eliminated. However, the deformation $\delta(x)$ of the linear ball guide 2 is not the table 1's deviation e(t) itself. The deviation e(t) is obtained from the deformation $\delta(x)$ as follows:

When the deformation $\delta(x)$ of the linear ball guide 2 is additively added as a displacement disturbance of the table 1, and the frequency characteristic of the position command is sufficiently lower than a speed control system, the equivalent exchange of the block diagram results in an error (the deviation e(t)) of $$e(t)=(1/Kp)\cdot(d\delta(x)/dt) \tag{1}$$

where Kp is the position loop gain, and $d\delta(x)/dt$ is the derivative of $\delta(x)$ with respect to the time t.

$$d\delta(x)/dt=(d\delta(x)/dx)\cdot(dx/dt)=v(t)\cdot(d\delta(x)/dx) \tag{2}$$

Accordingly, $$e(t)=(1/Kp)\cdot v(t)\cdot(d\delta(x)/dx) \tag{3}$$

In other words, the deviation e(t) of the table 1 generated by the deformation $\delta(x)$ of the linear ball guide 2 is a quantity obtained by multiplying, by the velocity, a derivative value of the deformation with respect to the displacement, and dividing the result with the position loop gain Kp.

As illustrated in FIG. 3, a displacement disturbance correction unit 15 outputs the deviation e(t) to cancel the displacement disturbance. The deviation e(t) is input into the subtractor 10. The subtracter 10 subtracts the deviation e(t) from the position command Xref, and accordingly the deviation e(t) generated by the deformation of the linear ball guide 2 can be completely cleared.

It is described below that the displacement disturbance theory agrees with experimental facts. The stage 9 illustrated in FIG. 1 was used to describe circles with radii=1 μm, 10 μm, 100 μm, and 1000 μm at frequencies of 0.01 Hz, 0.1 Hz, and 1 Hz. The stage 9 illustrated in FIG. 1 has only one axis and accordingly cannot perform arc motion with two axes, X and Y. Hence, a measurement result by the one axis of the stage 9 of FIG. 1 is set as the X-axis, and a waveform of the same measurement result as the X-axis is created as the Y-axis by the computer 5. They are synthesized to be plotted on an X-Y plane.

Figure 4:
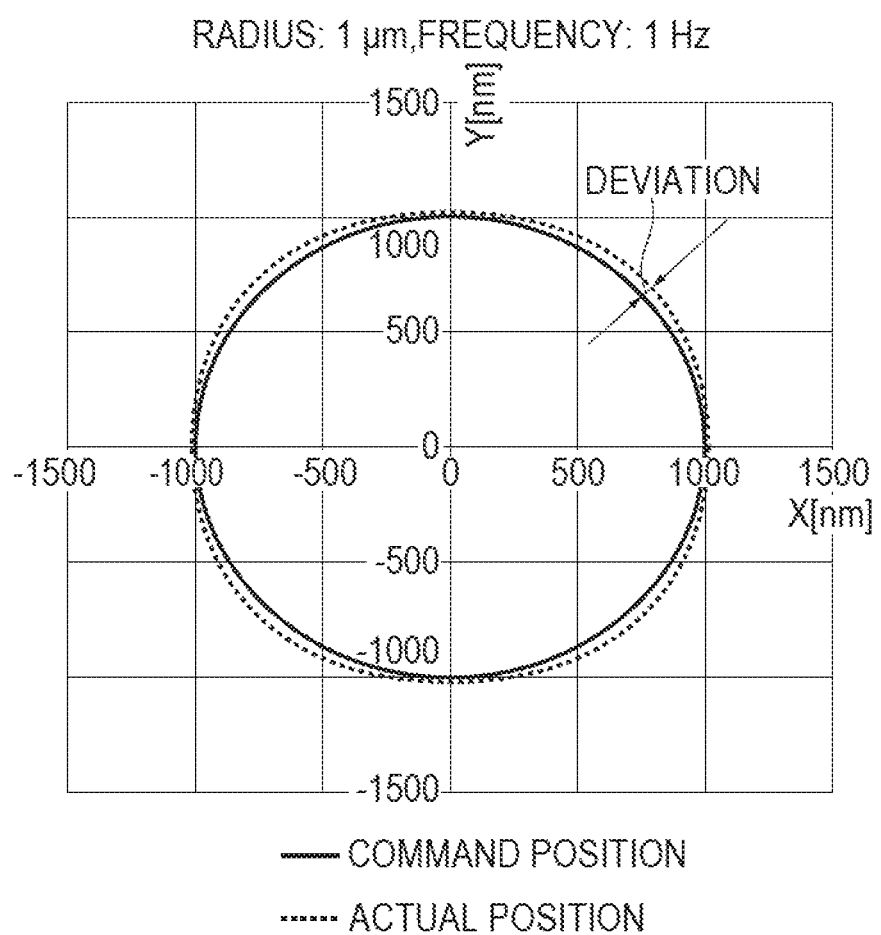
FIG. 4 is a graph illustrating a measurement result of a trajectory error.

Firstly, an error was generated without making a displacement disturbance correction. The error was evaluated. FIG. 4 illustrates an example (the radius is 1 μm and the frequency is 1 Hz) of a measurement result of a trajectory error. A perfect circle is a target position. In FIG. 4, the error between the target position and the actual position is enlarged at a rate four times, and is illustrated. As a result of the evaluation, it was found that "(i) if the radius is small, the deviation exists over the entire period".

FIGS. 5A to 5D illustrate error shapes at the time when the radius of the circle was changed while the frequency was maintained at 0.1 Hz. A solid line indicates a command position, and a broken line the error. FIGS. 5A to 5D illustrate error shapes at the time when an amplitude in the X-axis direction was changed to 1 μm (FIG. 5A), 10 μm (FIG. 5B), 100 μm (FIG. 5C), and 1000 μm (FIG. 5D). As a result of the evaluation, it was found that "(ii) if the radius of the circle is increased (R>1 mm), the deviation becomes like a spike".

Figure 6A:
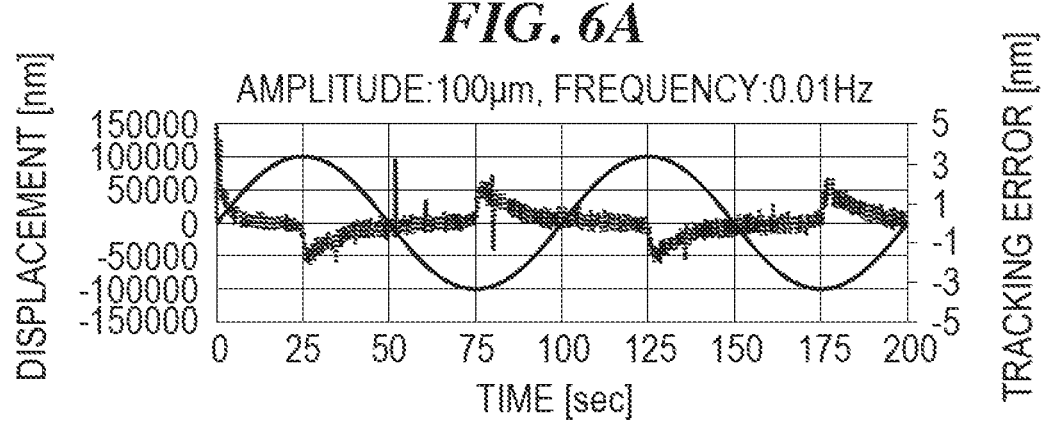
FIGS. 6A to 6C are graphs illustrating error shapes at the time when the frequency was changed while the radius of the circle was maintained constant (FIG. 6A is an illustration at a frequency of 0.01 Hz, FIG. 6B an illustration at a frequency of 0.1 Hz, and FIG. 6C an illustration at a frequency of 1 Hz).
Figure 6B:
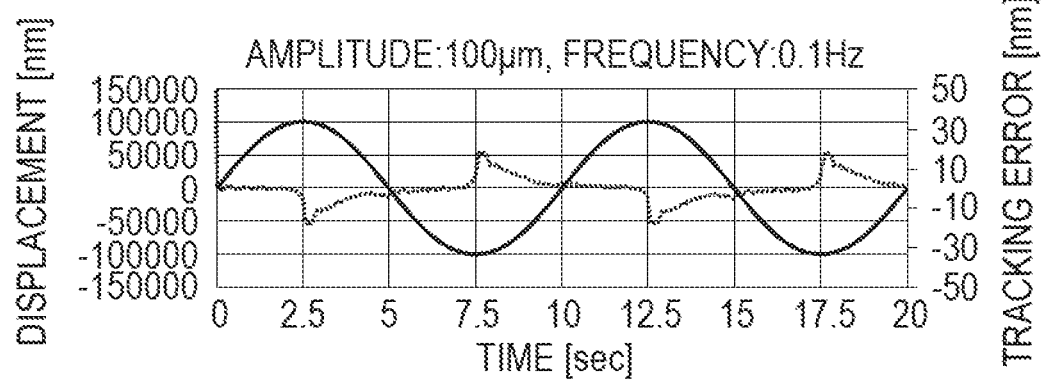
Figure 6C:
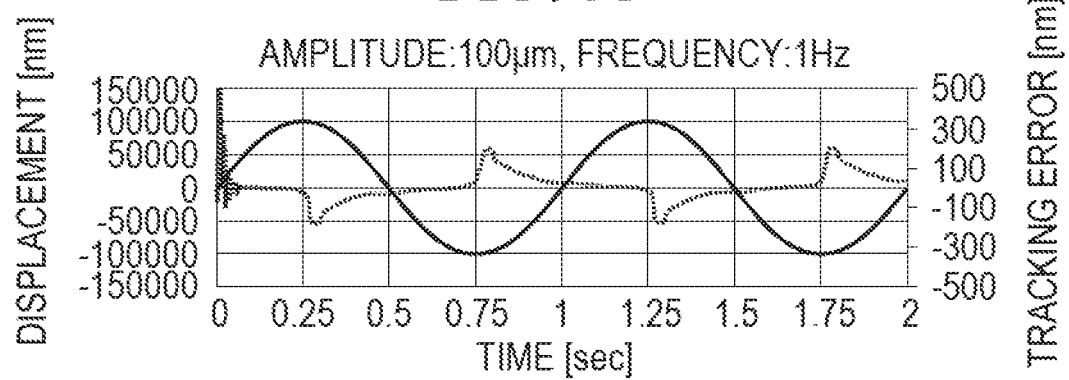

FIGS. 6A to 6C illustrate error shapes at the time when the frequency was changed to 0.01 Hz, 0.1 Hz, and 1 Hz while the radius (100 μm) of the circle was maintained constant. A solid line indicates a command position, and a broken line the error. FIG. 7 is the three superimposed error shapes of FIGS. 6A to 6C. As a result of the evaluation, it was found that "(iii) if the radius is fixed, the deviation shape is analog to time irrespective of frequency" and "(iv) if the radius is fixed, the magnitude of deviation is increased proportionally to frequency".

(i), (iii), and (iv) of the above results defy explanation in the known friction attributable theory. In the known friction attributable theory, it is considered that a phenomenon has not been grasped when R<1 mm. What completely agrees with these experimental facts is the displacement disturbance theory, which is described below.

In the circular path, x(t)=R sin ωt, accordingly, v(t)=Rω cos ωt, which is substituted into equation (3).

$$e(t)=(1/Kp)\cdot R\omega \cos \omega t \cdot (d\delta(x)/dx) \quad (4)$$

Figure 8:
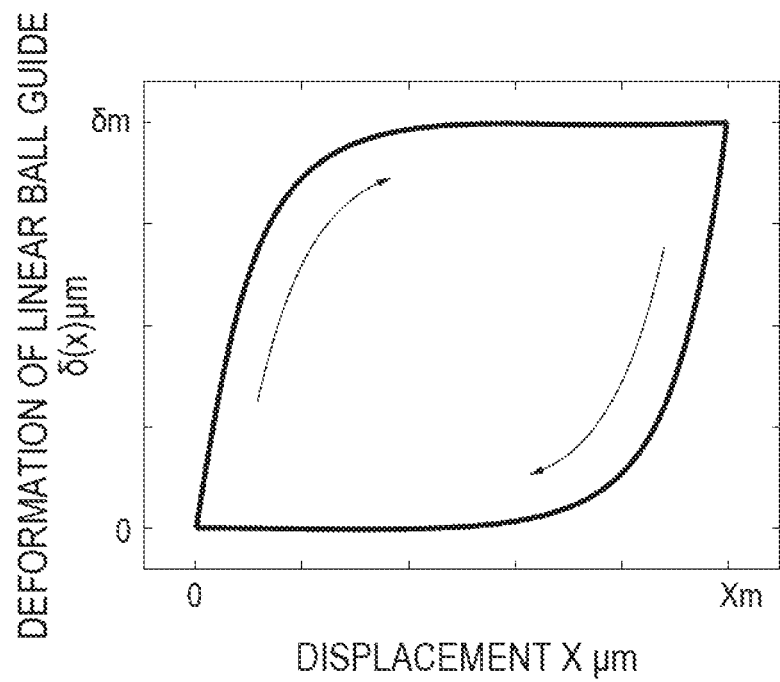
FIG. 8 is a graph illustrating the relationship between a displacement X and a deformation δ(x) of a linear ball guide used in simulations.

As illustrated in FIG. 8, the simplest expression of the non-linear spring characteristic of the linear ball guide 2 is imitated as:

$$\delta(x)=\delta m(1-\exp(-x(t)/L)) \text{ if } v(t)\geq 0$$

$$\delta(x)=-\delta m(1-\exp(-(R-x(t))/L)) \text{ if } v(t)<0 \quad (5)$$

Assuming here that L is the characteristic length of displacement (a constant representing the steepness of the amount of deformation), and δm is the amount of deformation, $$e(t)=(1/Kp)\cdot R\omega \cos \omega t \cdot (\delta m/L) \cdot \exp(-x(t)/L) \text{ if } v(t)>0$$

$$e(t)=(1/Kp)\cdot R\omega \cos \omega t \cdot (-\delta m) \cdot \exp(-(R-x(t))/L) \text{ if } v(t)<0 \quad (6)$$

is obtained.

As illustrated in FIG. 8, hysteresis is generated in the relationship between the displacement of the table 1 and the displacement of the linear ball guide 2.

Equation (6) is evaluated.

(i) When R<<L, exp(-x(t)/L) and exp(-(R-x(t))/L) have a value in the entire range of R, and the deviation is over the entire period.

(ii) When R>>L, exp(-x(t)/L) becomes like a spike.

(iii) When R is fixed, a path determined from equation (4) has a fixed shape.

(iv) The deviation is proportional to the frequency (=ω/2π) directly from equation (4).

Therefore, it agrees with all the experimental facts.

Figure 9:
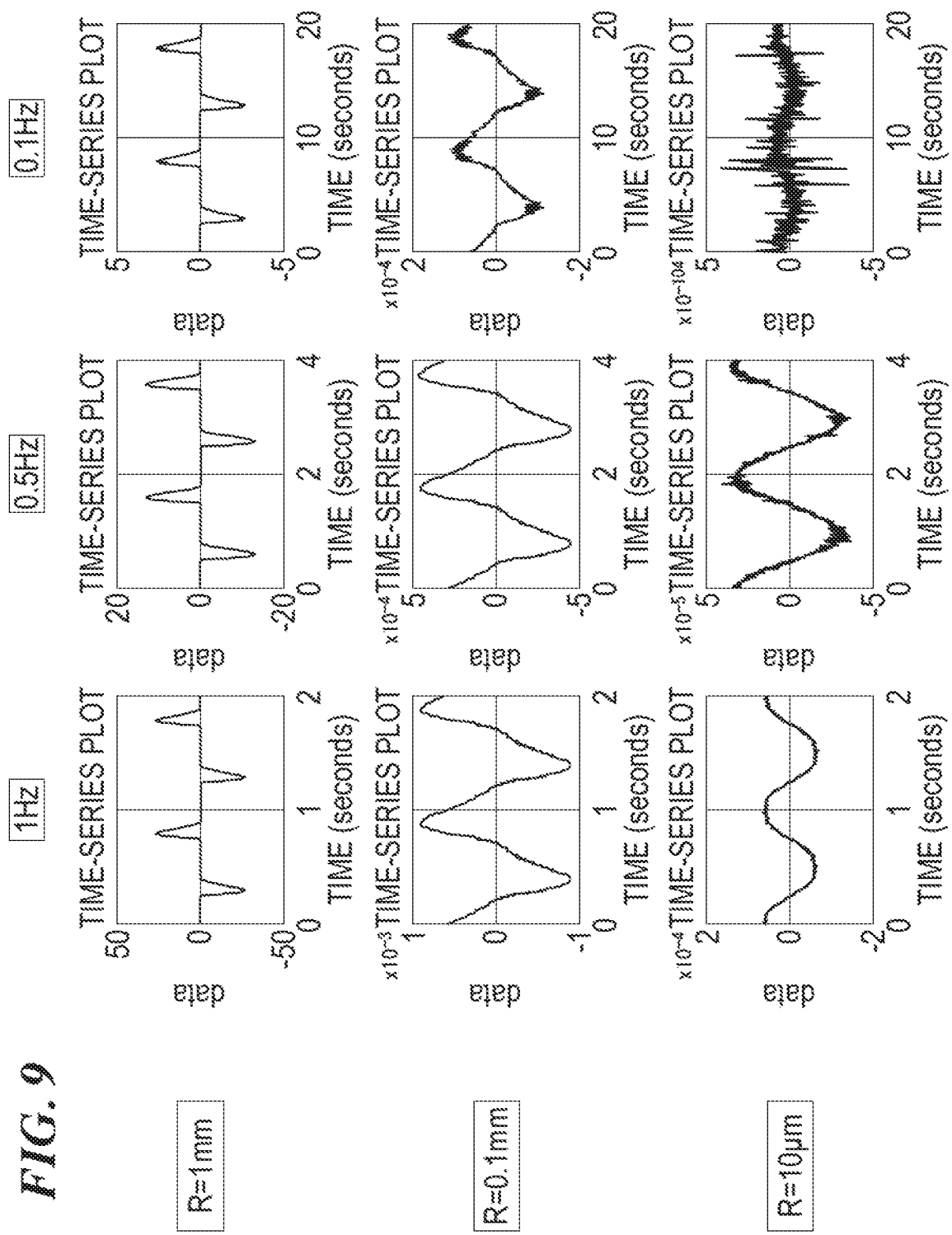
FIG. 9 is a graph illustrating simulation results.

FIG. 9 illustrates simulation results (Kp times) of a case where the deformation of the linear ball guide 2 was expressed by the simplest equation of equation (5). The function of the amount of deformation is dramatically simplified as compared to an actual one. However, results that agree well with the experimental results were qualitatively obtained.

The non-linear spring characteristic of the linear ball guide 2 that generates the hysteresis illustrated in FIG. 8 is as follows: The non-linear spring characteristic is exhibited by the relationship between a minute displacement generated when a force is applied to the guide block 2b and the applied force. A region where the linear ball guide 2 exhibits the non-linear spring characteristic is equal to or less than approximately several tens μm being a minute displacement that does not allow the ball 3 to roll.

FIGS. 10A to 10E illustrate the relationship between the applied force and the displacement at the time when being driven to a sine wave position command of a frequency of 0.01 Hz at which the inertia does not act on the guide block 2b. The vertical axis of FIGS. 10A to 10E is the applied force, and the horizontal axis is the actual position. As illustrated in FIG. 10A, a linear spring characteristic is exhibited with an amplitude of approximately 100 nm or lower. A region where the linear spring characteristic is exhibited is called a "linear spring region". As illustrated in FIGS. 10B, 10C, and 10D, a hysteresis curve is drawn with amplitudes of approximately 1 μm to 100 μm. A region where the hysteresis curve is drawn is called a "non-linear spring region". As illustrated in FIG. 10E, a steady-state rolling characteristic is exhibited at an amplitude of approximately 1 mm or greater. This rolling state is called a "rolling region". The characteristics in these three regions are generally called the non-linear spring characteristic.

As described above, the deviation e(t) at the time when a correction is not made is subtracted from the position command Xref of the table 1. Accordingly, the deviation caused by the linear ball guide 2 can be completely corrected. There are three types of deviation correction methods: a method in which the deviation is stored in a storage device (hereinafter referred to as the offline data table correction method); a method in which the deviation is calculated from an approximate equation (hereinafter referred to as the offline approximate equation method); and a method in which the deviation is calculated from the above equation (3) (hereinafter referred to as the online correction method). These methods are described in turn below.

<Offline Data Table Correction Method>

Firstly, an error is generated without making a correction. A deviation then occurs as illustrated in, for example, FIGS. 5A to 5D. Next, the deviation is stored as a data table in a storage device of the computer 5 over the entire period. FIG. 11 illustrates an example of data tables. The entire period is divided in, for example, 0 to 4000. A corresponding deviation is obtained according to the time. Data tables 0 to 4000 where the time and the deviation are associated are stored in the storage device.

Figure 12A:
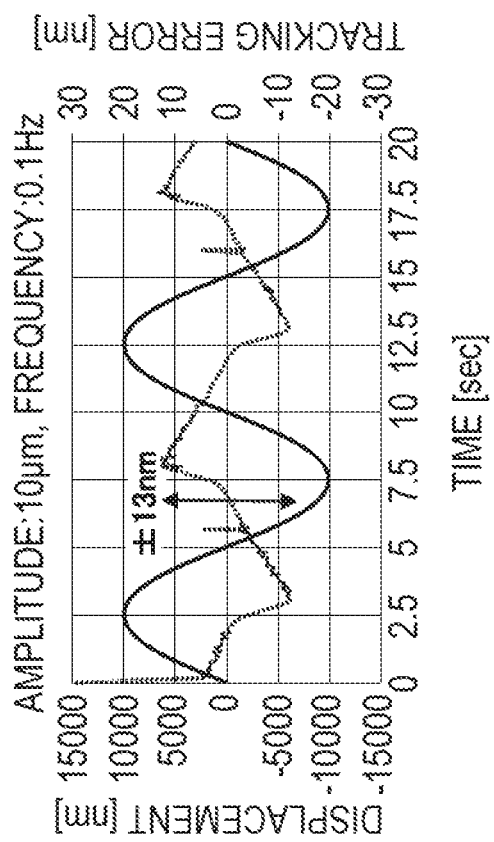
FIGS. 12A and 12B are graphs illustrating a result of correction by an offline data table correction method (FIG. 12A is an illustration before correction, and FIG. 12B an illustration after correction).
Figure 12B:
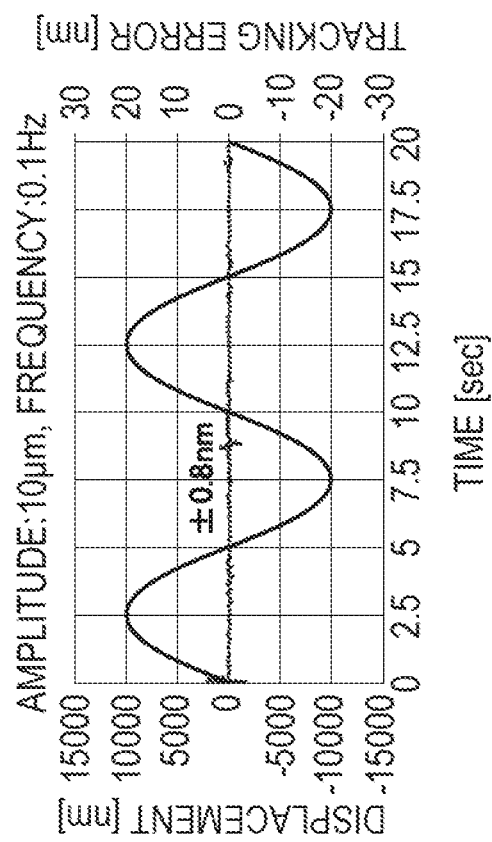

When a deviation is corrected, the computer 5 reads a data table stored in the storage device, and subtracts the deviation from a position command. FIGS. 12A and 12B illustrate results corrected by the offline data table correction method. FIG. 12A is an illustration before correction. FIG. 12B is an illustration after correction. The radius of a circle is 10 µm, and the frequency is 0.1 Hz. In graphs on the left sides of FIGS. 12A and 12B, solid lines indicate commands and broken lines errors. FIGS. 12A and 12B also illustrate deviations enlarged at a rate 100 times in graphs on the right sides. The deviation that was ±13 nm at the maximum before correction could be reduced to ±0.8 nm, and the deviation could be substantially cleared. As illustrated in the graph on the right side of FIG. 12B, a circle in the actual position also fits a circle in the command position. Although not illustrated, the deviation could be substantially cleared likewise also when the radii of circles were 1 µm, 100 µm, and 1000 µm.

It is also possible to perform repetitive control that repeatedly stores a deviation that occurred after correction in a data table, reads the deviation that occurred after correction from the data table, and subtracts the deviation from a position command. Repetitive control is performed, and accordingly the deviation can converge to zero.

However, the offline data table correction method is on the precondition that the operating conditions of the stage are constant. If the operating conditions of the stage change, a deviation that occurs is also different. Accordingly, it is necessary to store a new deviation in a data table. However, once the operating conditions of the stage are set, the stage is operated under the same conditions in many cases. The offline data table correction method is a simple correction method, and therefore is practical.

<Offline Approximate Equation Method>

Figure 13:
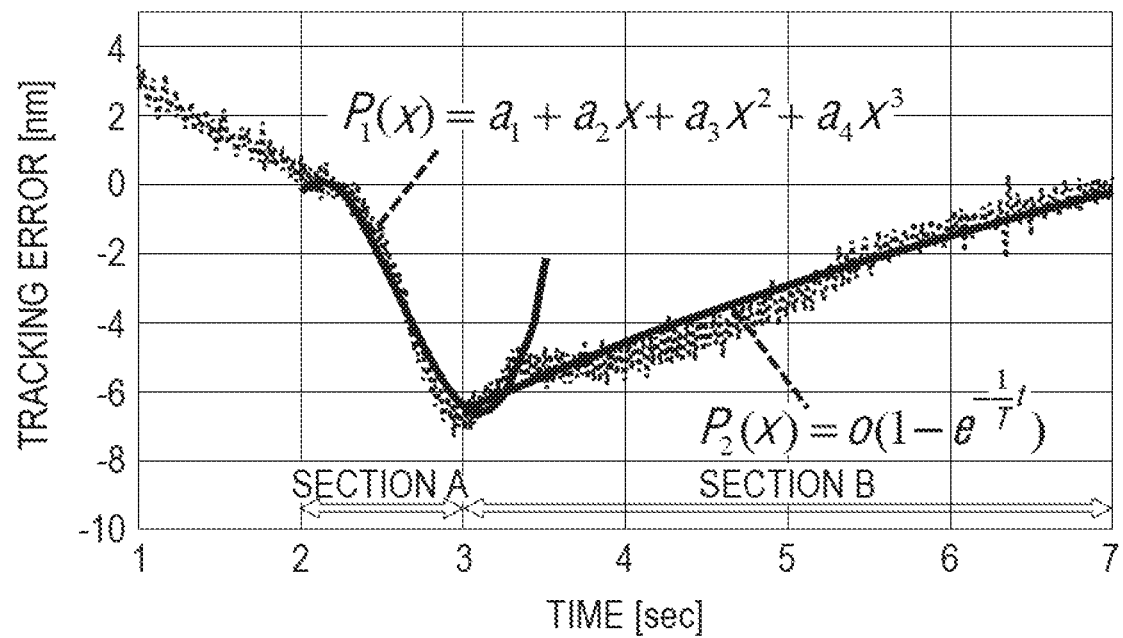
FIG. 13 is a graph illustrating enlarged deviations.

As in the offline data table correction method, firstly, an error is generated without making a correction. As illustrated in FIG. 13, deviations are plotted on a graph. Here, deviations generated at the time of reversing direction are divided into two sections, for each of which an approximate equation is obtained. A section A is considered to be deviations by the release of elastic deformation at the time of reversing direction, and a section B to be a section that returns the deviations generated in the section A under feedback control. The section A is approximated by a cubic equation, and the section B by an exponential function. Both are approximated by a function of the time x or t.

$a_1$ to $a_4$ in the cubic function, $P_1(x)=a_1+a_2x+a_3x^2+a_4x^3$, of the section A can be obtained from, for example, the least square method. x is the time. In the exponential function, $P_2(x)=o(1-\exp(-k \cdot t))$, of the section B, o is the amount of overshoot, $k(=1/T)$ is the constant, and t is the time.

Figure 14A:
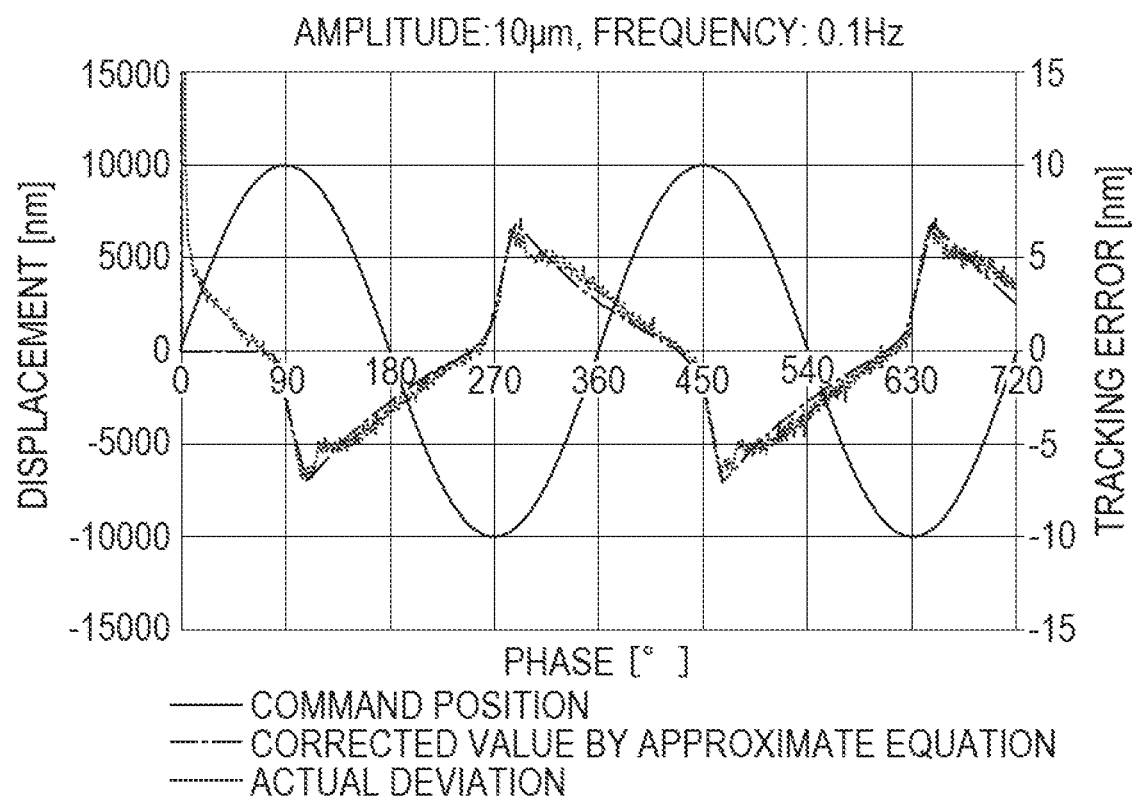
FIGS. 14A and 14B are graphs illustrating a result of correction by an offline approximate equation method (FIG. 14A is an illustration before correction, and FIG. 14B an illustration after correction).
Figure 14B:
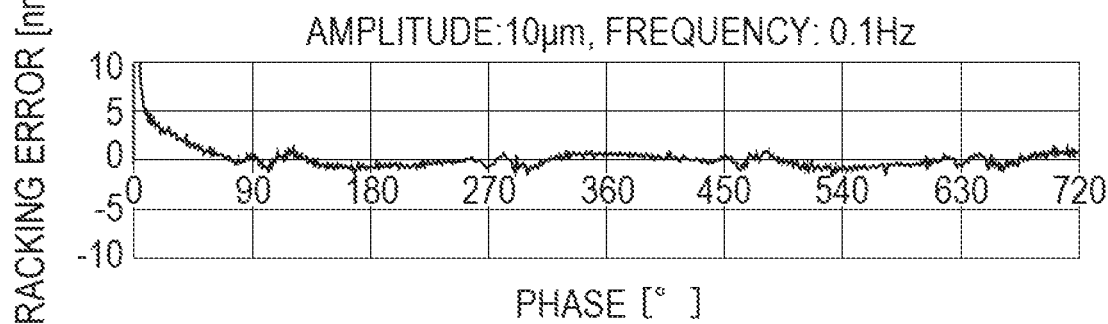

When deviations are corrected, the computer 5 calculates the deviation $P_1(x)$ and the deviation $P_2(x)$ from the approximate equations. The deviations $P_1(x)$ and $P_2(x)$ are then subtracted from the position command Xref. FIGS. 14A and 14B illustrate results corrected by the offline approximate equation method. FIG. 14A is an illustration before correction. FIG. 14B is an illustration after correction. As illustrated in FIG. 14B, the deviations were corrected with the approximate equations, and accordingly could be substantially cleared.

Figure 15B:
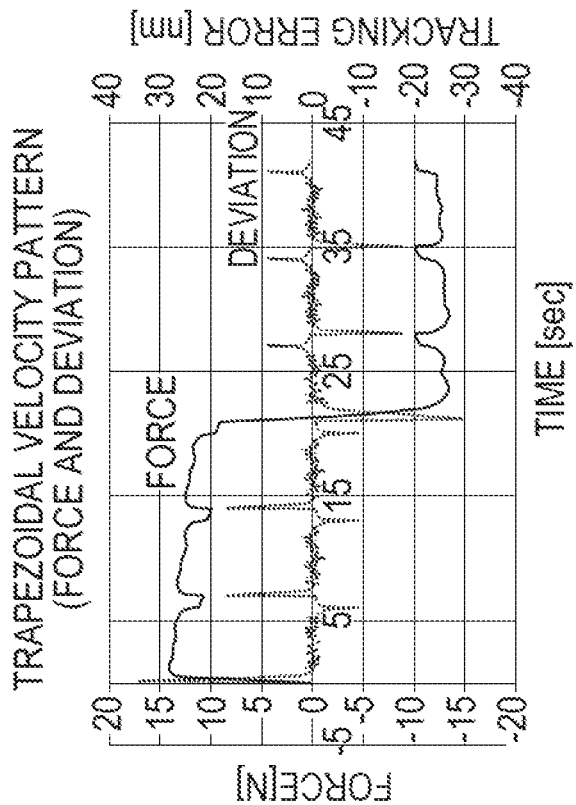
FIG. 15B is a graph illustrating force and deviation at the time when the stage was operated with three strokes in the same direction, and was operated with three strokes in the opposite direction.
Figure 15A:
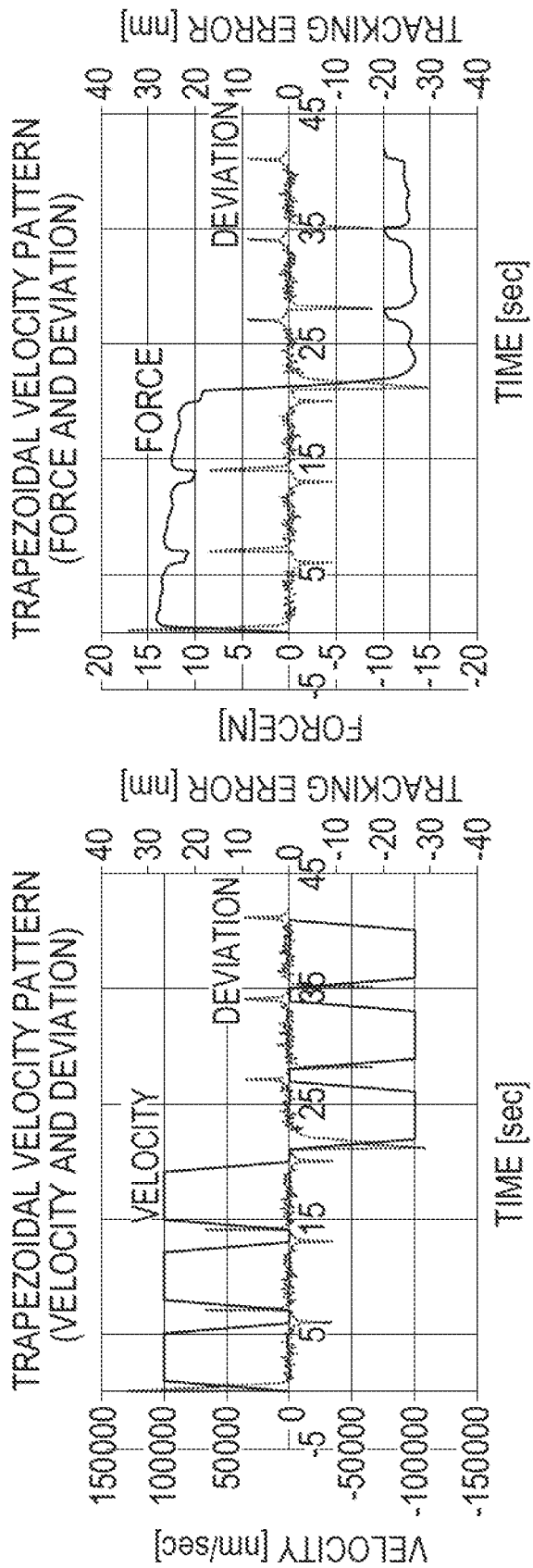
FIG. 15A is a graph illustrating velocity and deviation at the time when the stage was operated with three strokes in the same direction, and was operated with three strokes in the opposite direction.

FIG. 15A illustrates velocity and deviation at the time when the stage was operated with three strokes in the same direction, and was operated with three strokes in the opposite direction. FIG. 15B illustrates force and deviation at that time. It can be seen from FIGS. 15A and 15B that a large deviation occurs at the start of operation and at the time of reversing the operating direction. Even in the same operation, how a deviation occurs is different depending on how a force is applied immediately before starting moving. When the offline approximate equation method is used, it is also required to pay attention to this point.

<Online Correction Method>

Firstly, the deformation δ(x) of the linear ball guide 2 is determined by, for example, experimental measurements. As illustrated in FIG. 8 and equation (5), it is practical to approximate the deformation δ(x) by an exponential function being the shape of the non-linear spring characteristic. Next, the computer 5 calculates dδ(x)/dx. Next, information on x(t) and v(t) is obtained from the linear encoder 7. Next, the deviation e(t) is calculated from equation (3). The deviation e(t) is subtracted from the position command Xref to enable the online correction.

<Bock Diagram Based on Friction Force Disturbance Theory (A Theory that Assumes that a Friction Force Caused by the Non-Linear Spring Characteristic of the Linear Ball Guide 2 is added to the Table 1)>

It is assumed here that a friction force generated due to the non-linear spring characteristic of the linear ball guide 2 is added to the table 1. Equivalent exchange is then carried out on the control circuit for a friction force f of the linear ball guide 2, which is set as a quantity of the dimension of displacement. A calculated estimated value d^ (=deviation d) of the displacement disturbance is added to a position command r. The estimated value d^ of the displacement disturbance depends on cases of a PI controller and a P controller for speed control.

(1) In Case of PI Controller for Speed Control

Figure 16A:
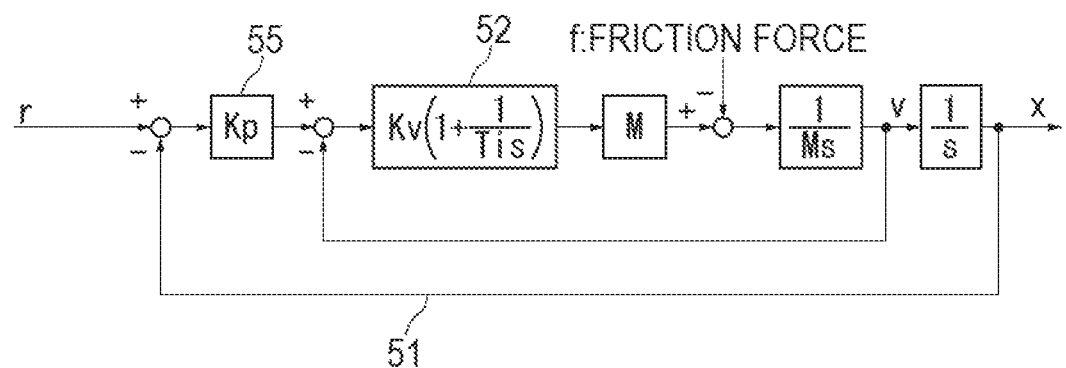
FIG. 16A is a block diagram based on a friction force disturbance theory (in a case of a PI controller for speed control)

FIG. 16A illustrates a block diagram of the position control apparatus in a case where a speed controller 52 is a PI (proportional-integral) controller. In FIG. 16A, r is the position command, Kp is the position loop proportional gain, Kv is the velocity loop proportional gain, Ti is the integral time, M is the mass of the movable body including the table 1, v is the actual velocity of the table 1, x is the actual position of the table 1, and s is the Laplace operator. In the block diagram, the friction force f is assumed to be added as a disturbance to the table 1 (a friction force disturbance theory). The friction force f interferes with the motion of the table 1. Accordingly, −f is assumed to be added to the table 1.

Figure 16B:
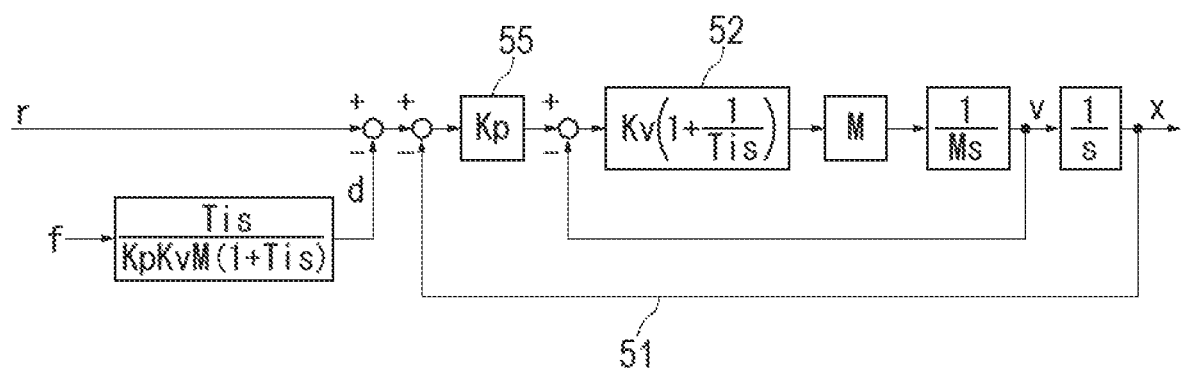
FIG. 16B is a block diagram where equivalent exchange has been carried out for a friction force.

When equivalent exchange is carried out to place the friction f before a position control loop 51, a block diagram illustrated in FIG. 16B is obtained. d is the displacement disturbance (deviation) due to the effect of the friction force f, and is in the same dimension as the position command r. d is expressed by the following equation (7):

$$d = \frac{f \cdot Ti \cdot s}{Kp \cdot Kv \cdot M(1+Ti \cdot s)} \quad (7)$$

Figure 20A:
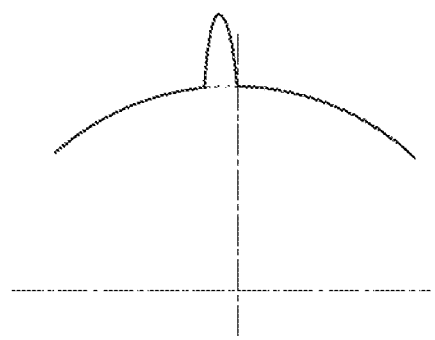
FIG. 20A is a diagram illustrating a motion error (deviation) in quadrant glitch form.
Figure 22A:
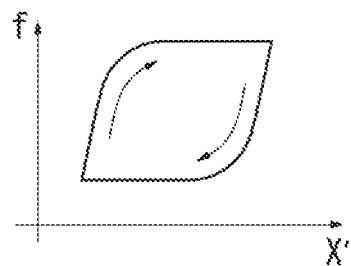
FIG. 22A is a graph representing a displacement x' and a friction force f(x')

An approximate derivative Ti·s/(1+Ti·s) is present in equation (7). f has a steep gradient at the rise and fall times (refer to FIG. 22A). Accordingly, as illustrated in FIG. 20A, the motion error (deviation) of this system becomes like a quadrant glitch. However, f is a function of time f(t), and strictly speaking, does not agree with f(x) being a function of position illustrated in FIG. 22A. A transformation from f(t) to f(x) is described in "(5) Online Correction Method (1)" described below.

Figure 17A:
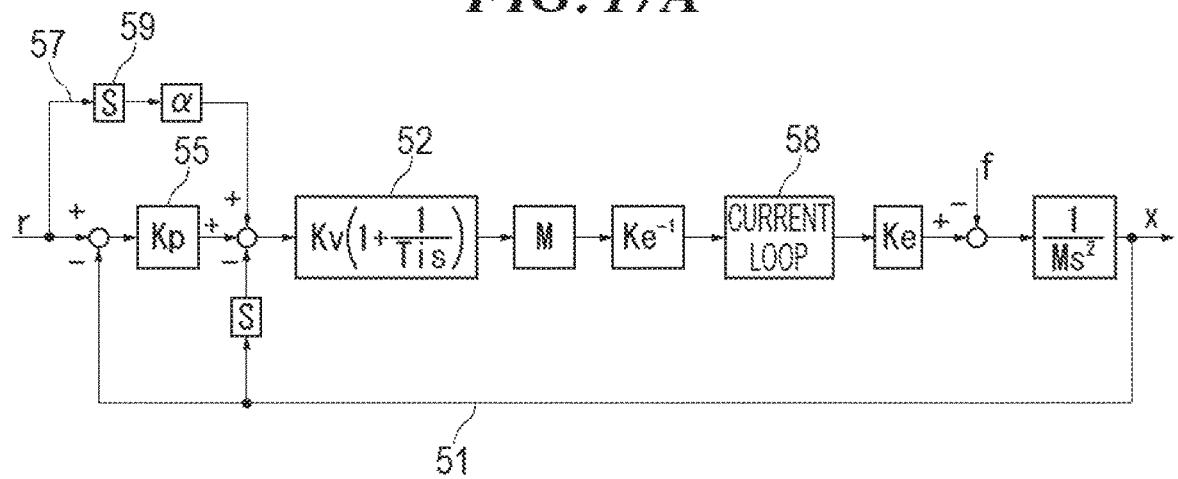
FIG. 17A is another example of the block diagram based on the friction force disturbance theory (in the case of the PI controller for speed control)

FIG. 17A illustrates another example of the block diagram in the case where the speed controller 52 is the PI (proportional-integral) controller. In this example, a feedforward loop 57 and a current loop 58 are added to the block diagram illustrated in FIG. 16A. The feedforward loop 57 compensates for a delay in the control system, differentiates the position command Xref by a differential circuit 59, and multiplies the result by feedforward gain α. If a response of the current loop 58 is at a sufficiently high speed for a speed control system, a transfer function of the current loop 58 can be considered to be one. Ke is the thrust-current constant [N/Arms].

Figure 17B:
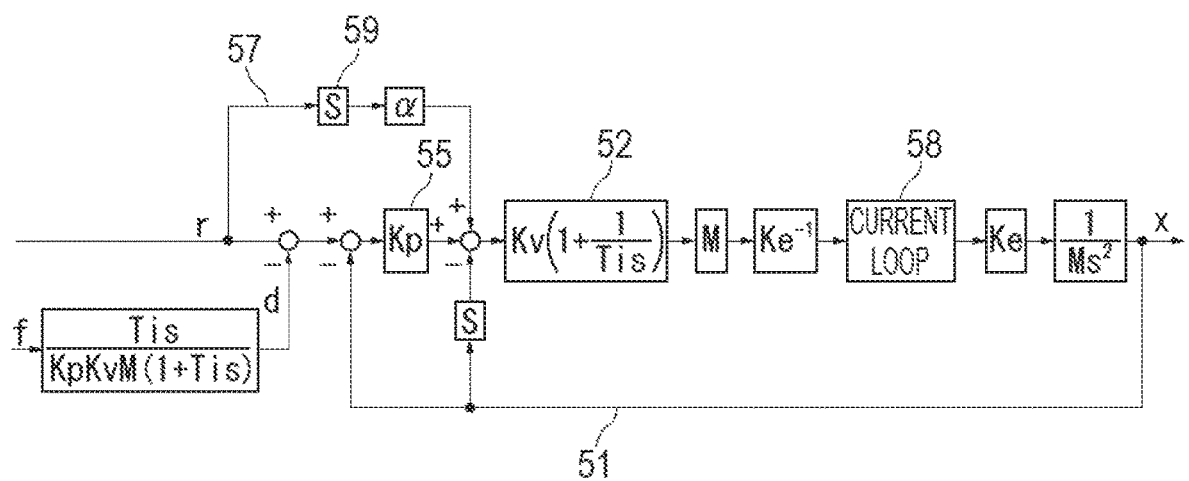
FIG. 17B is a block diagram where equivalent exchange has been carried out for the friction force.

When equivalent exchange is carried out to place the friction force f before the position control loop 51, a block diagram illustrated in FIG. 17B is obtained. d is the displacement disturbance (deviation) due to the effect of the friction force f. Even if there is the feedforward loop 57, d is not fed forward. Accordingly, d is expressed by the following equation (7) as in the block diagram of FIG. 16B.

$$d = \frac{f \cdot Ti \cdot s}{Kp \cdot Kv \cdot M(1 + Ti \cdot s)} \quad (7)$$

The reason that d is not fed forward is as follows: a quadrant glitch is a late phenomenon and d is small, and accordingly there is no need to provide feedforward. Feedforward is a kind of derivative action. Accordingly, compensation signals computed from real signals of the position x and the velocity v may become noisy due to this derivative action.

(2) In Case of P Controller for Speed Control

Figure 18A:
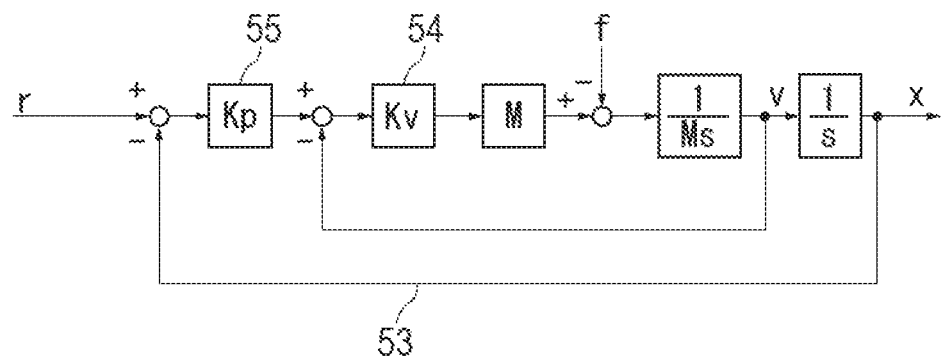
FIG. 18A is a block diagram based on the friction force disturbance theory (in a case of a P controller for speed control)

FIG. 18A illustrates a block diagram of the position control apparatus in a case where a speed controller 54 is a P (proportional) controller. In FIG. 18A, r is the position command, Kp is the position loop proportional gain, Kv is the velocity loop proportional gain, M is the mass of the movable body including the table 1, v is the actual velocity of the table 1, x is the actual position of the table 1, and s is the Laplace operator. Also in this block diagram, the friction force f is assumed to be added as a disturbance to the table 1 (a friction force disturbance theory).

Figure 18B:
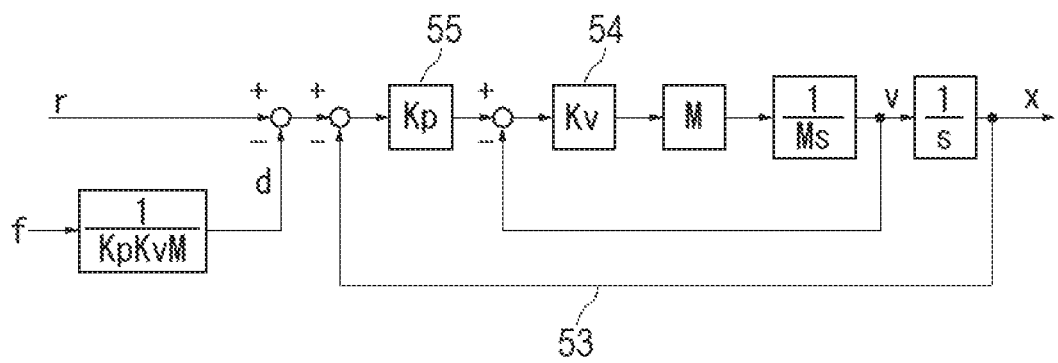
FIG. 18B is a block diagram where equivalent exchange has been carried out for the friction force.
Figure 20B:
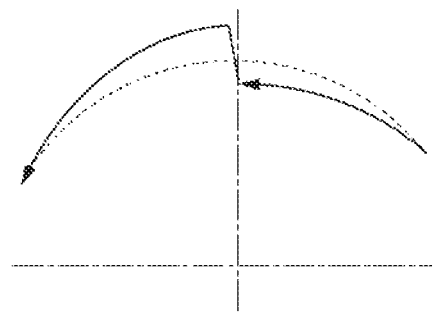
FIG. 20B is a diagram illustrating a motion error (deviation) in lost motion form.

When equivalent exchange is carried out to place the friction force f before the position control loop 53, a block diagram illustrated in FIG. 18B is obtained. d is the displacement disturbance (deviation) due to the effect of the friction force f, and is in the same dimension as the position command r. d is expressed by the following equation (8).

$$d = \frac{f}{Kp \cdot Kv \cdot M} \quad (8)$$

d is proportional to f from equation (8), and accordingly the shape of f is added as it is to r (refer to FIG. 22A). Hence, as illustrated in FIG. 20B, the motion error (deviation) of the system becomes like lost motion.

Figure 19A:
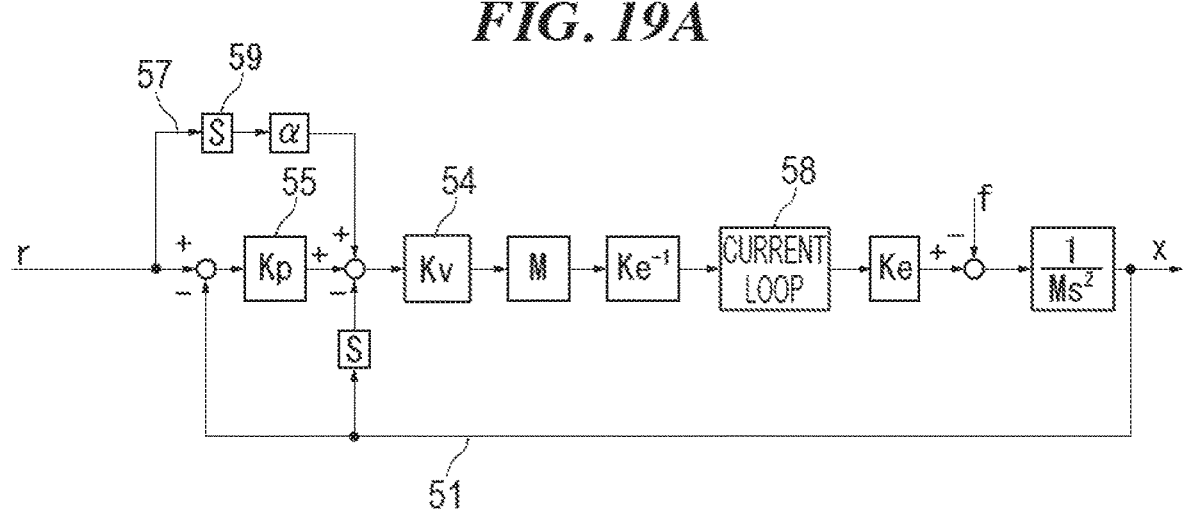
FIG. 19A is another example of the block diagram based on the friction force disturbance theory (in the case of the P controller for speed control)

FIG. 19A illustrates another example of the block diagram in a case where the speed controller 52 is the P (proportional) controller. In the example, the feedforward loop 57 and the current loop 58 are added to the block diagram illustrated in FIG. 18A.

Figure 19B:
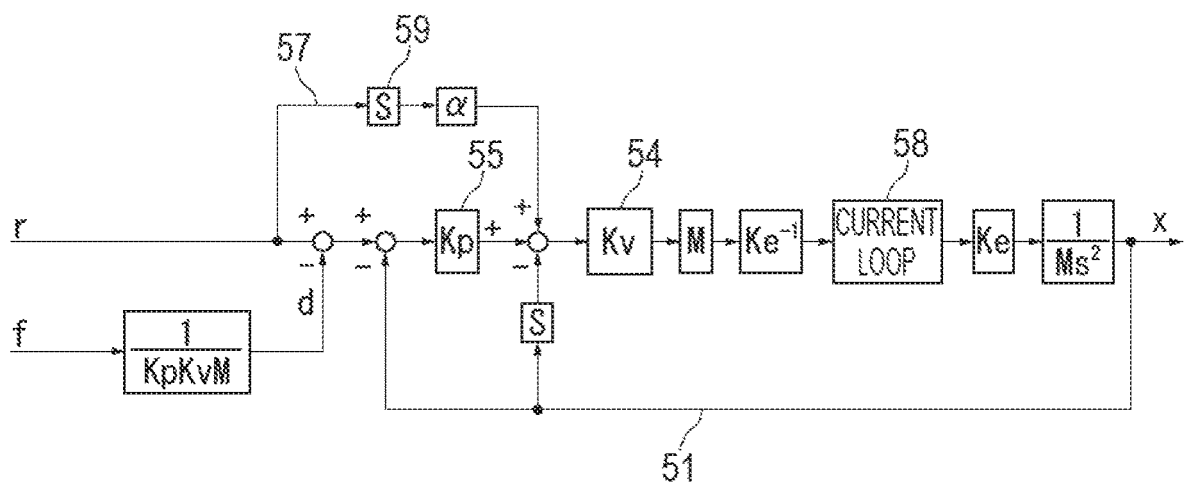
FIG. 19B is a block diagram where equivalent exchange has been carried out for the friction force.

When equivalent exchange is carried out to place the friction force f before the position control loop 51, a block diagram illustrated in FIG. 19B is obtained. d is the displacement disturbance (deviation) due to the effect of the friction force f. Even if there is the feedforward loop 57, d is not fed forward. Accordingly, d is expressed by the following equation (8) as in the block diagram of FIG. 18B.

$$d = \frac{f}{Kp \cdot Kv \cdot M} \quad (8)$$

(3) Principle of Friction Force Correction Method

Figure 21:
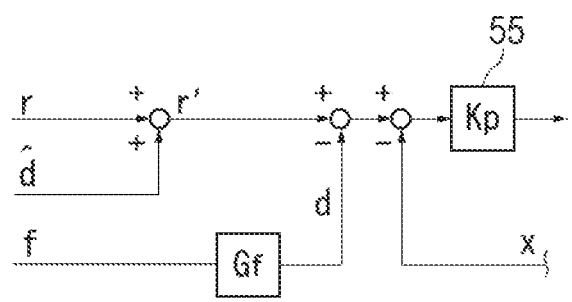
FIG. 21 is a block diagram explaining the principle of a friction force correction method.

FIG. 21 is a block diagram explaining the principle of a friction force correction method. In FIG. 21, Gf is the transfer function. As described above, in the case of PI for speed control, Gf=Ti·s/(Kp·Kv·M(1+Ti·s)), and in the case of the P controller for speed control, Gf=1/(Kp·Kv·M). A block diagram downstream of the position controller 55 is the same as FIGS. 16B and 18B and accordingly is omitted.

As illustrated in FIG. 21, firstly, the estimated value d^ (=deviation d) of the displacement disturbance is obtained (the details are described below). Next, when d^ is added to the position command r, that is, r'=r+d^, d and d^ are canceled out each other. It can be found that the estimated value d^ (=deviation d) of the displacement disturbance is added to the position command r, and accordingly the effect of the friction force f is cleared.

(4) Method for Estimating Displacement Disturbance d^

There are three types of methods for estimating the displacement disturbance d^: a method in which an error (the deviation d) is generated without making a correction, and the deviation d is stored in a storage device (an offline data table correction method); a method in which an error (the deviation d) is generated without making a correction, and the deviation d is calculated from an approximate equation (an offline approximate equation method); and a method in which the deviation d is calculated from a mathematical formula (an online correction method). The offline data table correction method and the offline approximate equation method are the same as those described above, and their detailed description is omitted.

(5) Online Correction Method (1)

Figure 22B:
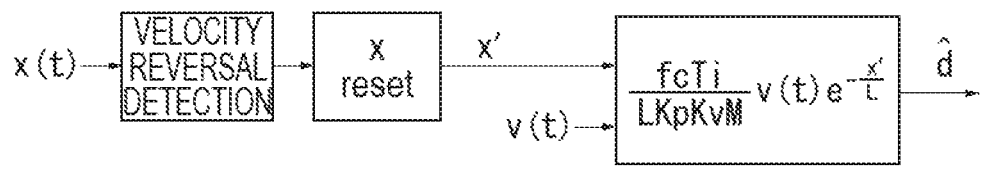
FIG. 22B is a block diagram explaining an online correction method in a case of the PI controller for speed control.
Figure 22C:
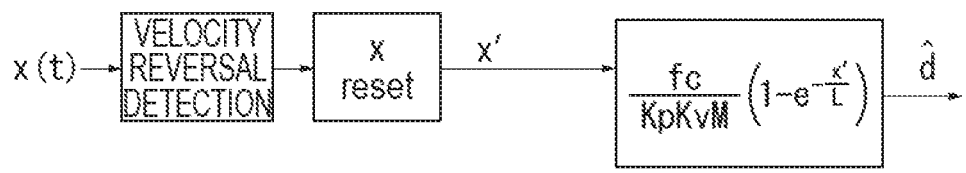
FIG. 22C is a block diagram explaining the online correction method in a case of the P controller for speed control.

FIGS. 22A to 22C illustrate block diagrams explaining the online correction method. As illustrated in FIG. 22A, it is assumed that the friction force f(x') is expressed by the following equation (9).

$$f(x') = fc(1 - \exp(-x'/L)) \text{ if } v(t) \geq 0$$

$$f(x') = -fc(1 - \exp(x'/L)) \text{ if } v(t) < 0 \quad (9)$$

where fc is the constant representing the magnitude of the friction force, L is the characteristic length (the constant representing the steepness of the friction force), and x' is the position having an origin at the time when the velocity is reversed. As illustrated in FIG. 22B, the reversal of the velocity of x(t) is detected to reset x(t). Accordingly, the position x' having an origin at the time when the velocity is reversed can be obtained.

When equation (9) is divided by Kp·Kv·M, the dimension is [m]. When this is written as δ(x'), $$\delta(x')=fc(1-\exp(-x'/L))/(Kp \cdot Kv \cdot M) \text{ if } v(t) \geq 0$$

$$\delta(x')=-fc(1-\exp(x'/L))/(Kp \cdot Kv \cdot M) \text{ if } v(t)<0 \quad (10)$$

In the case of the PI controller for speed control, the approximate derivative Ti·s/(1+Ti·s) is present. Accordingly, $$d=Ti \cdot d\delta(x')/dt=Ti \cdot v(t) \cdot d\delta(x')/dx'=fc \cdot Ti \cdot v(t) \cdot (\exp(-x'/L))/(L \cdot Kp \cdot Kv \cdot M) \quad (11)$$

Hence, as illustrated in FIG. 22B, the estimated value d^ (=deviation d) of the displacement disturbance can be calculated on the basis of x' and the velocity v(t).

FIG. 22B illustrates the block diagram of the case where v(t)≥0. However, if v(t)<0, equation (10) is required to be substituted.

In the case of the P controller for speed control, $$d=\delta(x')=fc \cdot (1-\exp(-x'/L))/(Kp \cdot Kv \cdot M) \text{ if } v(t) \geq 0$$

$$d=\delta(x')=-fc(1-\exp(x'/L))/(Kp \cdot Kv \cdot M) \text{ if } v(t)<0 \quad (12)$$

Hence, as illustrated in FIG. 22C, the estimated value d^ (=deviation d) of the displacement disturbance can be calculated on the basis of x'.

(6) Online Correction Method (2)

Figure 23A:
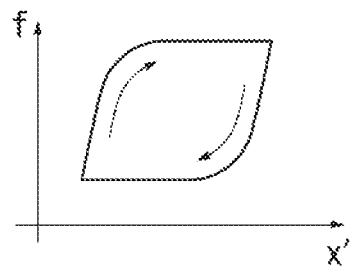
FIG. 23A is a graph representing the relationship between the displacement x' and the friction force f (x')
Figure 23B:
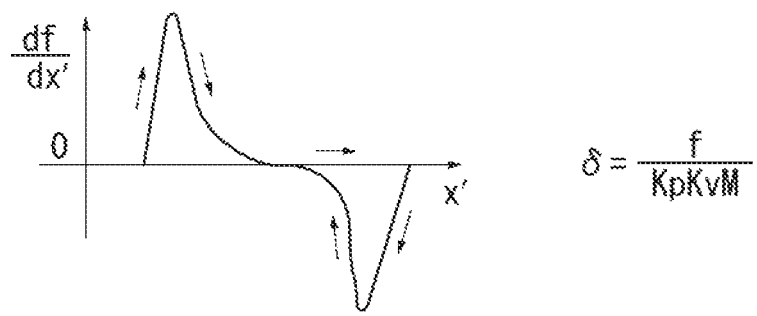
FIG. 23B is a graph obtained by differentiating the graph of FIG. 23A with respect to x.

The actual friction force is not as simple as expressed by equation (9). In this case, the friction force is actually measured. As illustrated in FIG. 23A, a graph 1 representing the relationship between the displacement x' and the friction force f is obtained in advance.

Figure 23C:
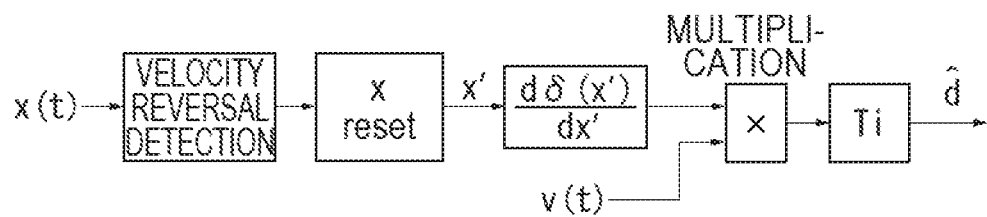
FIG. 23C is a block diagram explaining the online correction method in the case of the PI controller for speed.

In the case of the PI controller for speed control, a graph 2 obtained by differentiating the graph 1 with respect to x is obtained in advance. d=Ti·dδ(x')/dt=Ti·v(t)·dδ(x')/dx holds from equation (11). Accordingly, as illustrated in FIG. 23C, the estimated value d^ of the displacement disturbance can be calculated on the basis of x' and the velocity v(t).

Figure 23D:
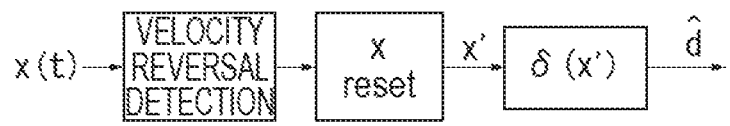
FIG. 23D is a block diagram explaining the online correction method in the case of the P controller for speed.

In the case of the P controller for speed control, d=δ(x') holds from equation (12). Accordingly, as illustrated in FIG. 23D, the estimated value d^ of the displacement disturbance can be calculated on the basis of x'.

According to the position control apparatus of the embodiment, the following effects are exerted. The deviation e(t) caused by the deformation δ(x) of the linear ball guide 2 or the estimated value d^ (=deviation d) of the displacement disturbance caused by the friction force f of the linear ball guide 2 is subtracted from or added to the position command Xref of the table 1. Accordingly, the deviation of the table 1 caused by the non-linear spring characteristic of the linear ball guide 2 can be substantially eliminated.

A deviation is stored in advance in a data table to enable a correction to the deviation (the offline data table correction method). The offline data table correction method is on the precondition that the operating conditions of the stage 9 are constant, but is a simple correction method and accordingly is a practical correction method.

A deviation is calculated from an approximate equation being a function of time. Accordingly, the deviation can be corrected.

Equivalent exchange is carried out on the control circuit for the friction force f of the linear ball guide 2, which is set as a quantity of the dimension of displacement. The estimated value d^ (=deviation d) of the displacement disturbance is calculated. The estimated value d^ (=deviation d) of the displacement disturbance is added or subtracted to or from a position command of the table 1. Accordingly, the deviation of the table 1 can be corrected with a displacement signal with much higher accuracy of control than force. A more accurate correction can be made, and also the configuration for correction is made simpler. Moreover, a quadrant glitch error and a lost motion error can also be corrected with totally the same configuration only by dividing speed control into PI controller and P controller, and changing part of a correction computing equation.

Upon calculating d in equations (11) and (12), the friction force f (x') is not a function of the time t but a function of the displacement x'. Accordingly, the friction force f (x') can be approximated with high accuracy from the actually measured non-linear spring characteristic (refer to FIGS. 10A to 10E, FIG. 22A, and FIG. 23A) of the linear ball guide 2. Therefore, the calculated deviation d can be approximated to the actual deviation with high accuracy.

As in the known position control apparatus described in Patent Literature 1, when the thrust of the table is corrected by a friction force calculated on the basis of the non-linear spring characteristic of the linear ball guide, the friction force is difficult to directly measure. In addition, verification on whether or not the friction force has been properly corrected can be performed only by evaluating the deviation of the table. Moreover, a quadrant glitch error occurs in the case of the PI controller for speed control, and a lost motion error occurs in the case of the P controller for speed control. However, the position control apparatus described in Patent Literature 1 is described only on the former point.

The position control apparatus of the embodiment is suitable for contour control when the position control apparatus has a structure of two X-Y axes.

Second Embodiment

Figure 24:
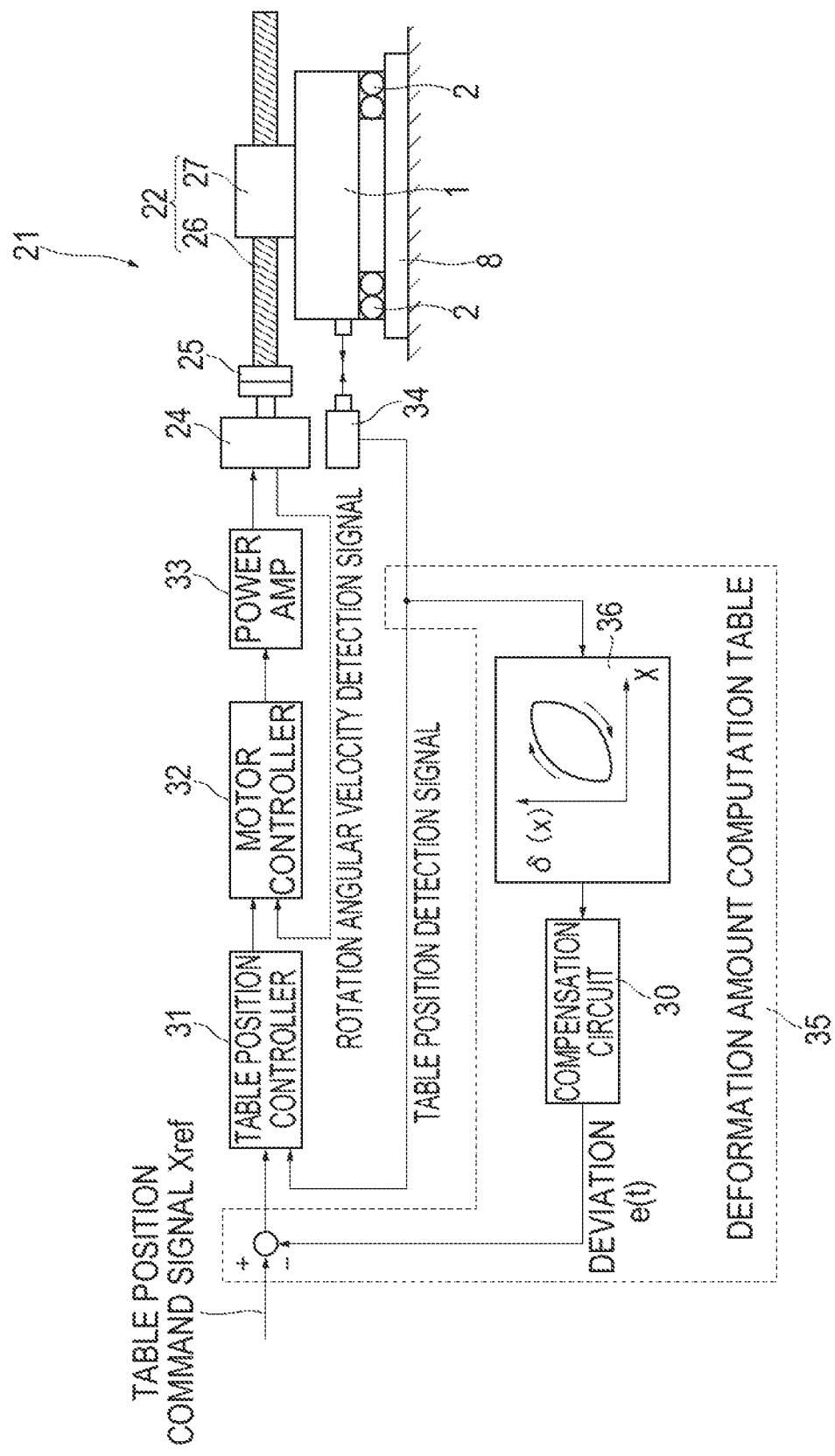
FIG. 24 is a schematic diagram of a stage in which a position control apparatus of a second embodiment of the present invention is integrated.

FIG. 24 is a schematic diagram of a stage 21 as a positioning apparatus in which a position control apparatus of a second embodiment of the present invention is integrated. The stage 21 of the embodiment includes the linear ball guides 2 as rolling apparatuses, and a ball screw 22 as a rolling apparatus. The table 1 is guided by the linear ball guide 2 in an axis direction with respect to the base 8 to be driven by the ball screw 22 in the axis direction. The second embodiment is different in the respect that the table 1 as the movable body is driven by the ball screw 22, from the first embodiment in which the table 1 is driven by the linear motor 4.

The ball screw 22 includes a screw shaft 26 as a first member connected to a motor 24 via a coupling 25, and a nut 27 as a second member that is threadedly engaged with the screw shaft 26 via multiple balls as rolling elements and is fixed to the table 1. When the motor 24 rotates the screw shaft 26, the nut 27 performs linear motion in the axis direction. With the rotation of the screw shaft 26, the balls interposed between the screw shaft 26 and the nut 27 perform rolling motion and are circulated by a circulation component such as a return pipe. Preload is applied to the ball screw 22 to eliminate backlash.

Although being different in the respect that in the ball screw 22, the rolling elements move along a spiral path while in the linear ball guide 2, the rolling elements move along a straight path, the ball screw 22 and the linear ball guide 2 are both the same in the respect that the rolling elements are interposed between the first and second members in a manner capable of rolling motion. In the position control apparatus of the embodiment, a correction circuit 35 reduces deviation (typically, a quadrant glitch) caused by the non-linear spring characteristic of the ball screw 22, or eliminates the deviation to zero.

A deviation caused by the linear ball guide 2 also occurs, but is much smaller than the deviation caused by the non-linear spring characteristic of the ball screw 22 and accordingly is ignored here. The first embodiment is required to be applied by analogy to also reduce the deviation caused by the linear ball guide 2.

The position control apparatus is the same as a general position control apparatus, apart from the correction circuit 35. In other words, the position control apparatus includes a table position controller 31 that controls the position of the table 1, a motor controller 32 that controls the speed of the motor 24, and a power amplifier 33 that supplies electric power to the motor 24. The position of the table 1 is detected by a position detector 34 such as a linear encoder. The table position detection signal is fed back to the table position controller 31. The angular velocity of the motor 24 is detected by a rotary encoder. The rotation angular velocity detection signal is fed back to the motor controller 32.

<Block Diagram Based on Displacement Disturbance Theory (A Theory that Assumes that the Deformation $\delta(x)$ Caused by the Non-Linear Spring Characteristic of the Ball Screw 22 is Additively Added to the Position (Position Control System Output y) of the Table 1)>

Figure 25:
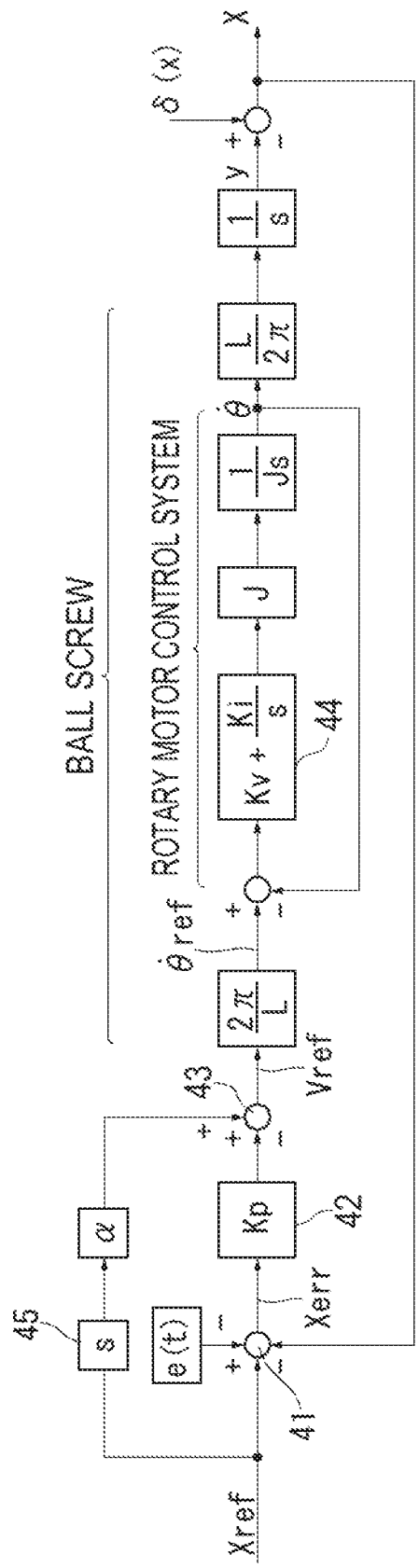
FIG. 25 is a block diagram of a control system of the position control apparatus of the second embodiment of the present invention (a block diagram based on a displacement disturbance theory).

FIG. 25 illustrates a block diagram of the control system. The control system includes a position control system and a speed control system (rotary motor control system). In the embodiment, a current control system is not provided to a minor loop of the speed control system. However, it is also possible to provide the current control system.

Also in the block diagram of the embodiment, the deformation $\delta(x)$ (however, $\delta$: the amount of deformation, x: the position) of the ball screw 22 caused by the non-linear spring characteristic is assumed to be additively added as a disturbance to the position of the table 1. In other words, the position X of the table 1 is assumed to be one obtained by adding the deformation $\delta(x)$ of the ball screw 22 to the position control system output y of the table 1.

The position X of the table 1 is detected by the table position detector 34. The table position detection signal is input into a subtractor 41. The deviation e(t) calculated by a compensation circuit 30 (refer to FIG. 24) is also input into the subtractor 41. The subtractor 41 subtracts the actual position X and the deviation e(t) from the position command Xref to calculate the deviation Xerr. The deviation Xerr is input into a position controller 42. The position controller 42 performs proportional controls on position to output the velocity command Vref on the basis of the product of the deviation Xerr and Kp.

The velocity command Vref of the table 1 is input into an adder 43. A feedforward value obtained by inputting the position command Xref into a differential circuit 45 and multiplying the result by $\alpha$ is also input into the adder 43. The subtracter 41, the position controller 42, the adder 43, and the differential circuit 45 configure the table position controller 31 of FIG. 24.

In the rotary motor control system, the velocity command Vref is multiplied by $2\pi/L$ (here, L is the lead of the ball screw). The velocity of the table 1 is transformed into the angular velocity of the motor 24. An angular velocity command $\theta'$ref is calculated. A speed controller 44 performs proportional-integral control on the angular velocity of the motor 24 in such a manner that an actual angular velocity $\theta'$ of the motor 24 agrees with the angular velocity command $\theta'$ref. In FIG. 25, Kp is the position loop proportional gain, Kv is the angular velocity proportional gain, and Ki is the angular velocity integral gain. J is the load inertia, and s is the Laplace operator. The speed controller 44 configures the motor controller 32 of FIG. 24. If the actual angular velocity $\theta'$ of the motor 24 is multiplied by $L/2\pi$, the velocity of the table 1 can be obtained. The velocity of the table 1 is integrated to obtain the position control system output y of the table 1.

Figure 26:
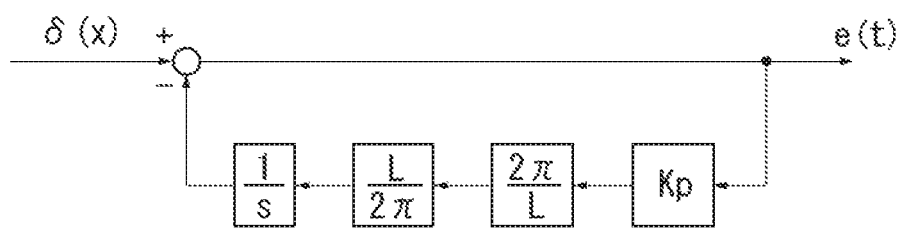
FIG. 26 is a block diagram from δ(x) to a deviation e(t).

Here, assume that the frequency response of the speed control system is sufficiently faster than the frequency response of the position command, and is set as one. When a block diagram is drawn from the deformation $\delta(x)$ to the deviation e(t), FIG. 26 is obtained. The following equation is obtained from the block diagram of FIG. 26.

$$e(t)=(1/Kp)\cdot(d\delta(x)/dt) \qquad (13)$$

where Kp is the position loop proportional gain, and $d\delta(x)/dt$ is the derivative of $\delta(x)$ with respect to the time t.

$$d\delta(x)/dt=(d\delta(x)/dx)\cdot(dx/dt)=v(t)\cdot(d\delta(x)/dx) \qquad (14)$$

Accordingly, $$e(t)=(1/Kp)\cdot v(t)\cdot(d\delta(x)/dx) \qquad (15)$$

Equations (13) to (15) are the same as equations (1) to (3) for calculating the deviation e(t) caused by the deformation $\delta(x)$ of the linear ball guide 2. Therefore, the deviation e(t) caused by the deformation $\delta(x)$ of the ball screw 22 is also a quantity obtained by multiplying a value of the derivative of the deformation $\delta(x)$ of the ball screw 22 with respect to the displacement X by velocity, and dividing the result by the position control loop proportional gain Kp, as in the linear ball guide 2.

The deviation e(t) at the time when a correction is not made is subtracted from the position command Xref of the table 1. Accordingly, the deviation caused by the ball screw 22 can be reduced. There are three types of deviation correction methods: the offline data table correction method; the offline approximate equation method; and the online correction method. They are as described above. A supplementary explanation of the online correction method is given below.

The correction circuit 35 of FIG. 24 includes a deformation amount computation table 36 and the compensation circuit 30. The relationship between the deformation $\delta(x)$ of the ball screw 22 and the position X of the table 1 is recorded in the deformation amount computation table 36. The deformation $\delta(x)$ is the deformation of the ball screw 22. A graph illustrating the relationship between the deformation $\delta(x)$ and the position X is similar to the graph of the non-linear spring characteristic of the ball screw 22, and can be obtained by experiment.

The compensation circuit 30 calculates the deviation e(t) on the basis of equation (15). The deviation e(t) is subtracted from the table position command signal Xref, and accordingly the deviation caused by the non-linear spring characteristic of the ball screw 22 can be reduced.

Figure 27A:
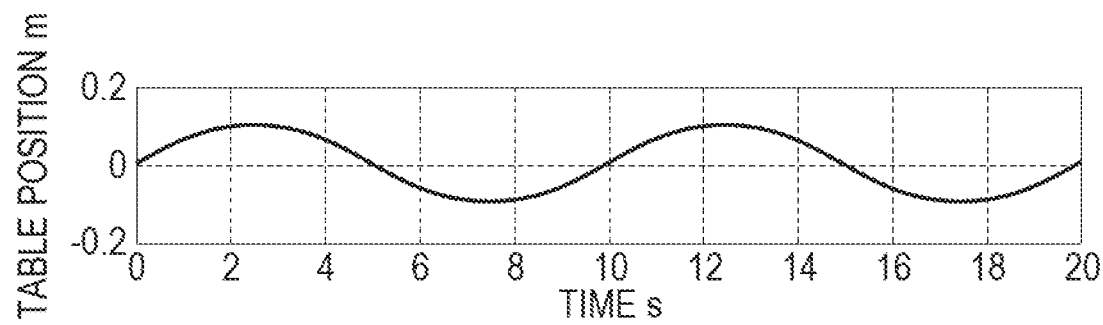
FIGS. 27A to 27C are graphs illustrating simulation results (FIG. 27A illustrates a table position, FIG. 27B illustrates a motor speed, and FIG. 27C illustrates the deformation of a ball screw and a linear ball guide).
Figure 27B:
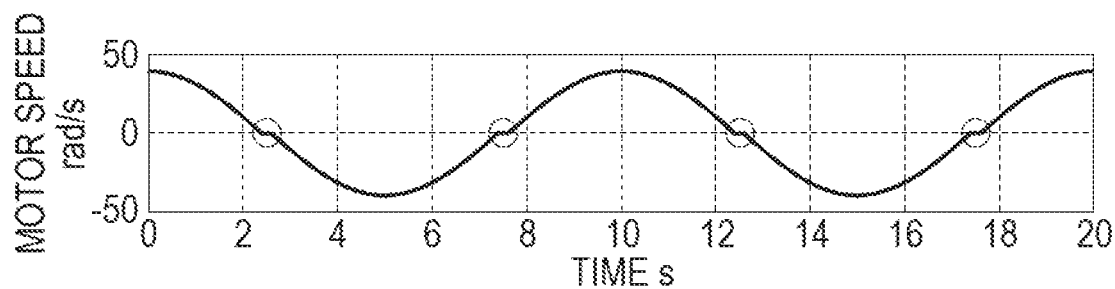
Figure 27C:
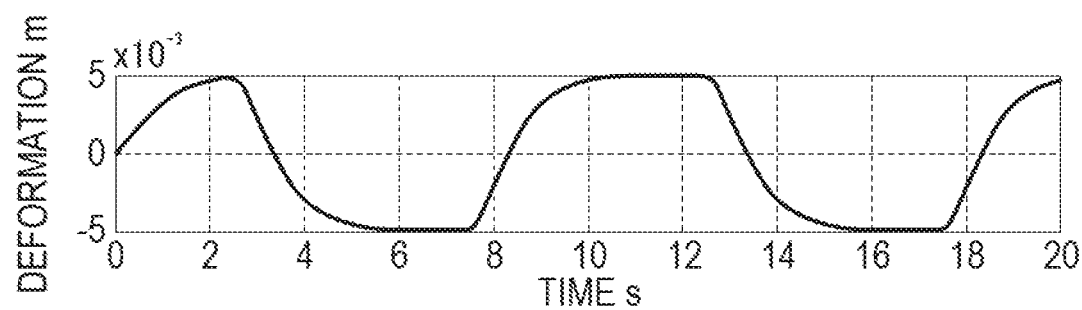

FIGS. 27A to 27C illustrate results of a simulation using the block diagram of FIG. 25. As illustrated in FIG. 27A, the table 1 moves ±0.1 m with a period of 0.1 Hz. The lead of the ball screw 22 is 10 mm. As illustrated in FIG. 27B, the motor 24 rotates at ±40 rad/s. When the rotation of the motor 24 is reversed (at points encircled by o in FIG. 27B), there are times when the speed of the motor 24 becomes zero. This is because the ball screw 22 deforms as illustrated in FIG. 27C.

Figure 28A:
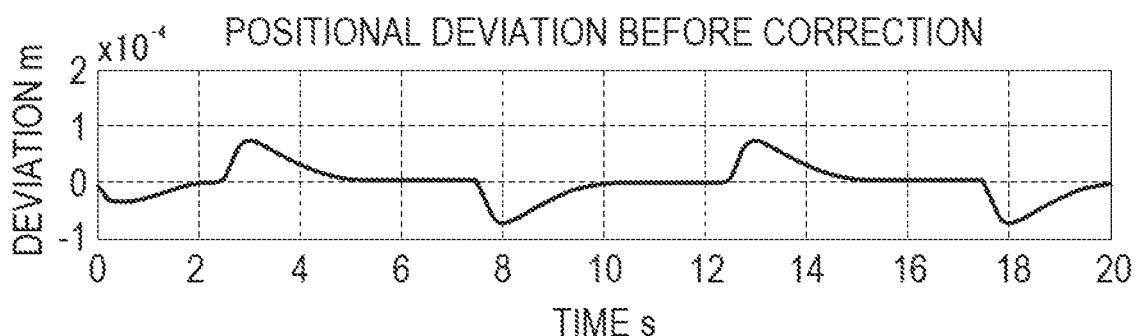
FIGS. 28A to 28C are graphs illustrating simulation results (FIG. 28A illustrates a positional deviation before correction, FIG. 28B illustrates a correction signal (the deviation e(t)), and FIG. 28C illustrates the positional deviation after correction).
Figure 28B:
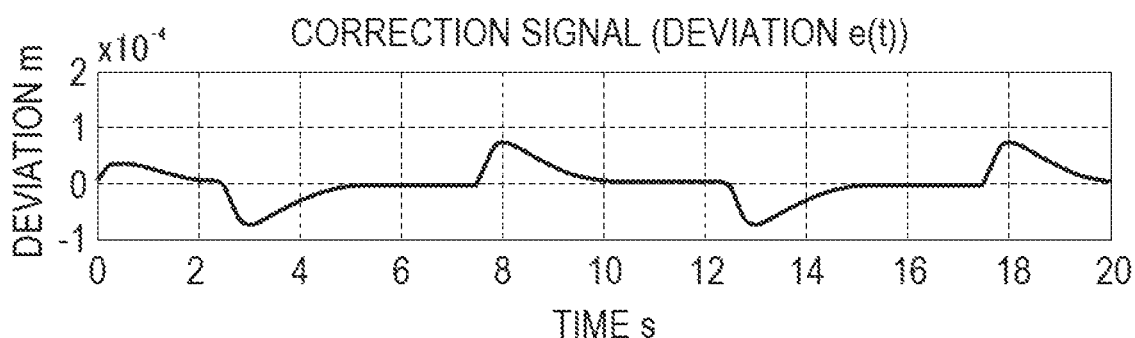
Figure 28C:
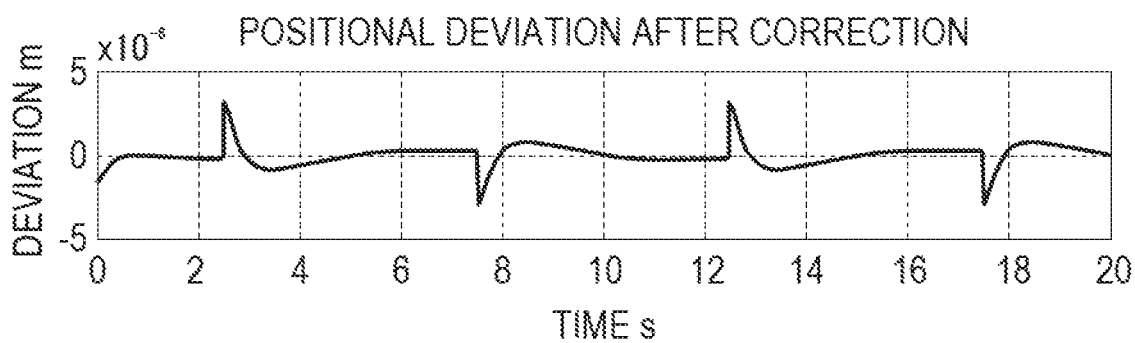

The ball screw 22 deforms. Accordingly, as illustrated in FIG. 28A, a positional deviation of approximately ±0.8× $10^{-4}$ m occurs on the table 1 before correction. As illustrated in FIG. 28B, a correction signal (the deviation e(t)) is generated to be subtracted from the position command of the cable 1. The waveform of the correction signal (the deviation e(t)) is vertically reversed with respect to the waveform of the positional deviation before correction. As illustrated in FIG. 28C, the positional deviation of the table 1 is reduced to approximately ±3×10$^{-6}$ m after correction.

<Block Diagram Based on Friction Force Disturbance Theory (A Theory that Assumes that the Friction Force Caused by the Non-Linear Spring Characteristic of the Ball Screw 22 is Added to the Table 1)>

It is assumed here that friction torque τ caused by the non-linear spring characteristic of the ball screw 22 is added to the ball screw 22. Equivalent exchange is then carried out on the control circuit for the friction torque τ of the ball screw 22, which is set as a quantity of the dimension of displacement. The calculated estimated value d^ (=deviation d) of the displacement disturbance is added to the position command Xref. The estimated value d^ of the displacement disturbance depends on the cases of a PI controller and a P controller for speed control.

(1) In Case of PI Controller for Speed Control

Figure 29A:
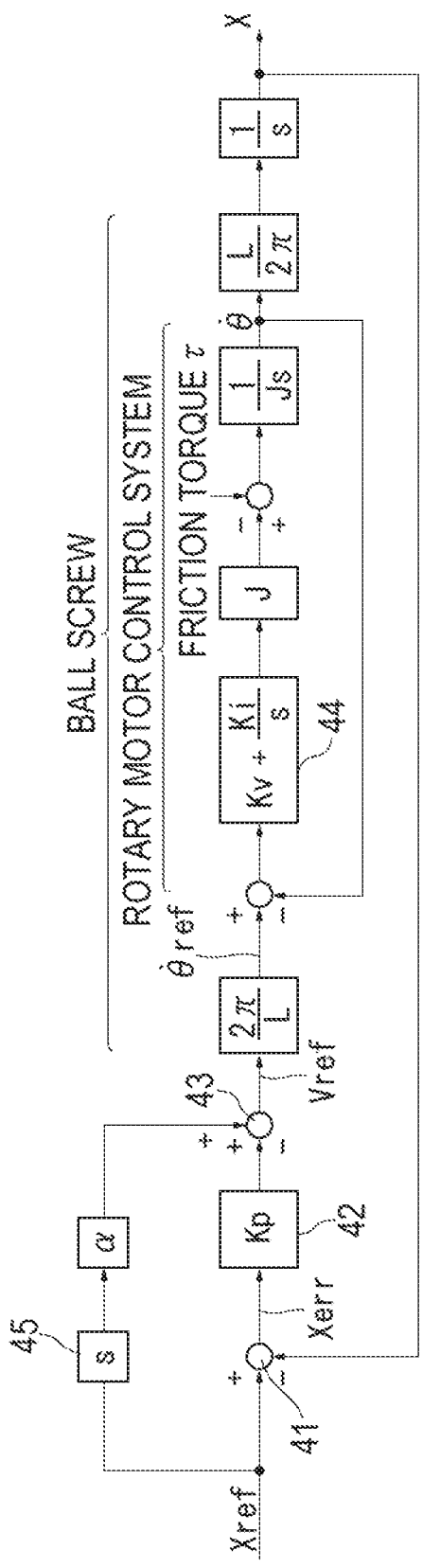
FIG. 29A is a block diagram based on the friction force disturbance theory (in a case of a PI controller for speed control)

FIG. 29A illustrates a block diagram of the position control apparatus in a case where the speed controller 44 is a PI (proportional-integral) controller. Symbols of the block diagram of FIG. 29A are the same as the symbols of the block diagram of FIG. 25. In the block diagram of FIG. 29A, it is assumed that the friction torque τ is added as a disturbance to the ball screw 22 (a friction force disturbance theory).

Figure 29B:
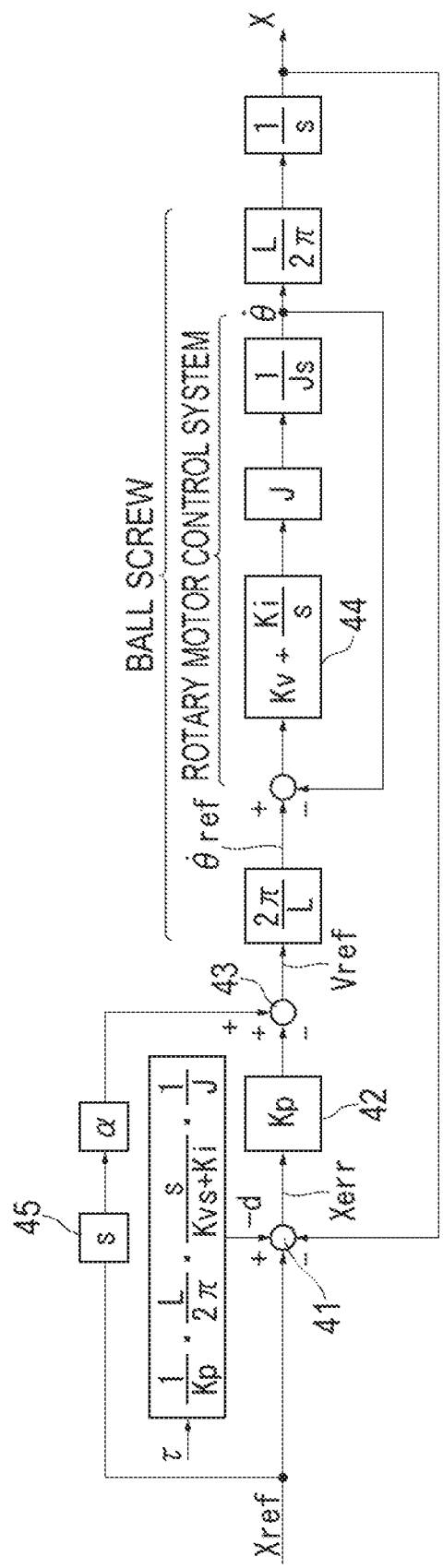
FIG. 29B is a block diagram where equivalent exchange has been carried out for a friction force.

When equivalent exchange is carried out to place the friction torque τ before the position control loop, a block diagram illustrated in FIG. 29B is obtained. d is the displacement disturbance (deviation) due to the effect of the friction torque τ, and is in the same dimension as the position command Xref. d is expressed by the following equation (16).

$$d = \tau \cdot \frac{1}{Kp} \cdot \frac{L}{2\pi} \cdot \frac{s}{Kv \cdot s + Ki} \cdot \frac{1}{J} \quad (16)$$

(2) In Case of P Controller for Speed Control

Figure 30A:
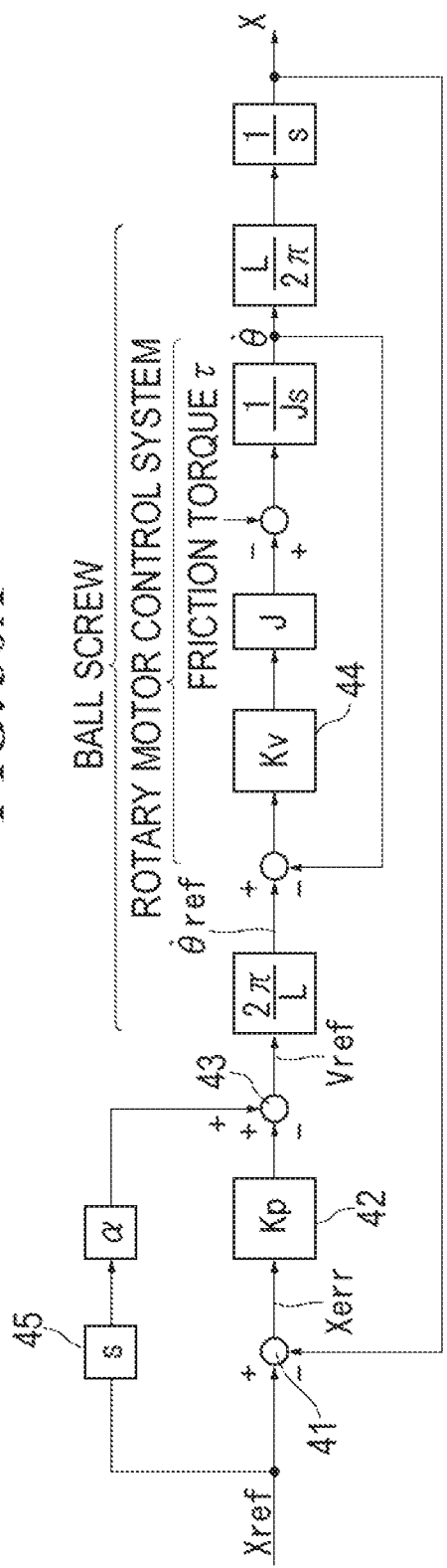
FIG. 30A is a block diagram based on the friction force disturbance theory (in a case of a P controller for speed control)

FIG. 30A illustrates a block diagram of the position control apparatus in a case where the speed controller 44 is a P (proportional) controller. Also in the block diagram, it is assumed that the friction torque τ is added as a disturbance to the ball screw 22 (the friction force disturbance theory).

Figure 30B:
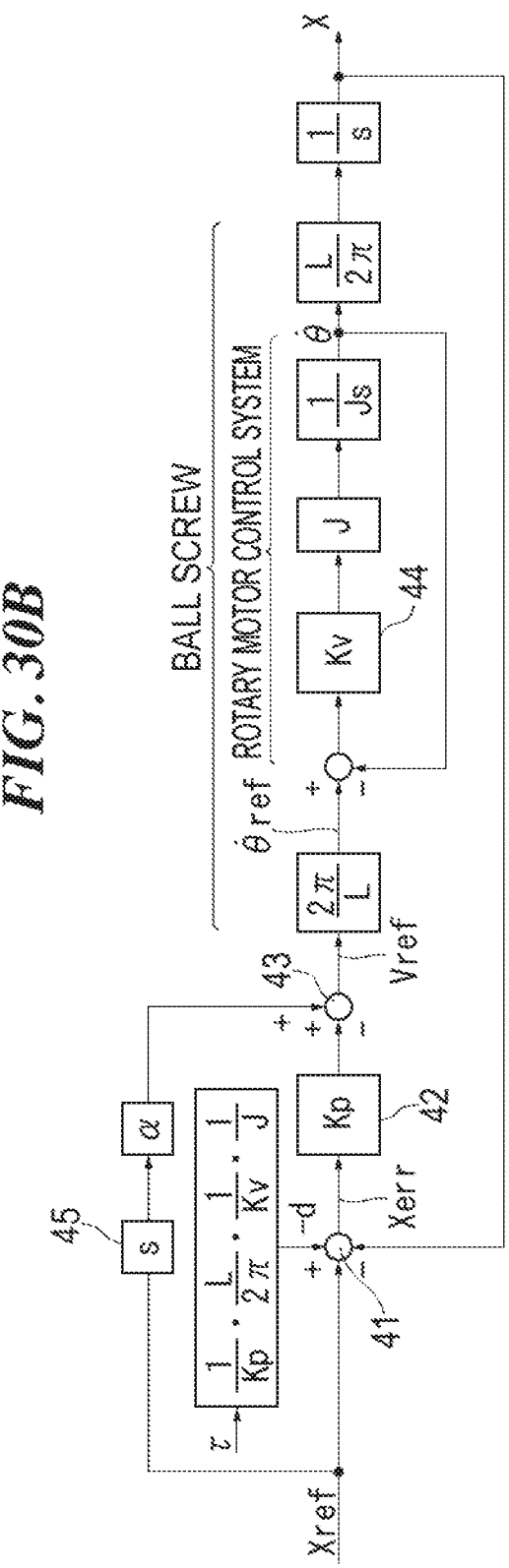
FIG. 30B is a block diagram where equivalent exchange has been carried out for the friction force.

When equivalent exchange is carried out to place the friction torque τ before the position control loop, a block diagram illustrated in FIG. 30B is obtained. d is the displacement disturbance (deviation) due to the effect of the friction torque τ, and is in the same dimension as the position command Xref. d is expressed by the following equation (17).

$$d = \tau \cdot \frac{1}{Kp} \cdot \frac{L}{2\pi} \cdot \frac{1}{Kv} \cdot \frac{1}{J} \quad (17)$$

(3) Principle of Friction Force Correction Method

As described in the first embodiment, when d^ is added to the position command Xref, that is, Xref'=Xref+d^, d and d^ are canceled out each other. Hence, the estimated value (deviation) d^ of the displacement disturbance is added to the position command Xref to clear the effect of the friction torque τ.

(4) Method for Estimating Displacement Disturbance d^

There are three types of methods for estimating the displacement disturbance d^: a method in which an error (deviation) is generated without making a correction, and the deviation is stored in a storage device (an offline data table correction method); a method in which an error (deviation) is generated without making a correction, and the deviation is calculated from an approximate equation (an offline approximate equation method); and a method in which a deviation is calculated from a mathematical formula (an online correction method). The offline data table correction method and the offline approximate equation method are the same as those in the first embodiment. The online correction method is based on the same idea as the first embodiment.

Example 1

Figure 31:
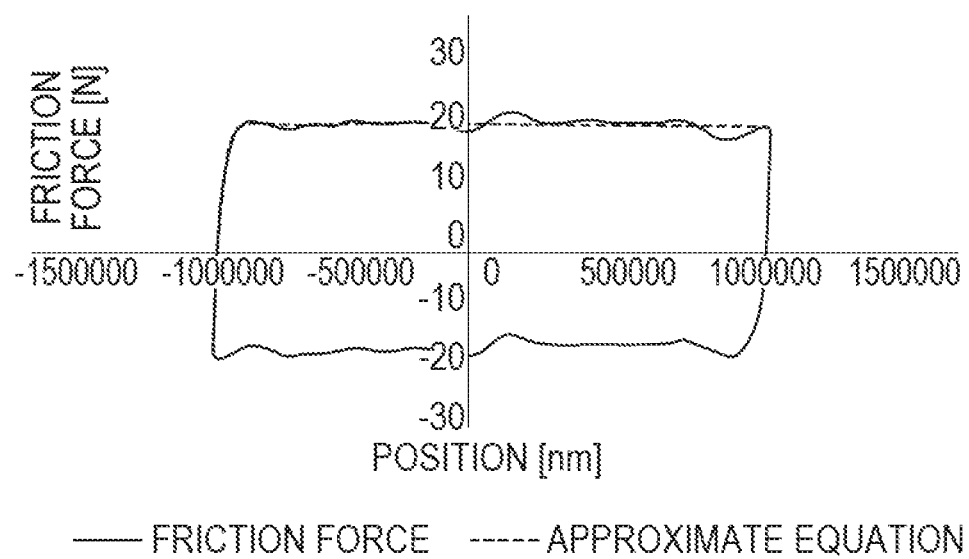
FIG. 31 is a graph illustrating the non-linear spring characteristic.

The non-linear spring characteristic of the table 1 illustrated in FIG. 1 was measured. Specifically, a sine wave position command at a low frequency that did not cause inertia to act on the table 1 drove the table 1. The displacement of the table 1 and the applied force were measured, and were graphed as illustrated in FIG. 31. The displacement of the table 1 was detected by the linear encoder 7. The applied force was calculated from a measured current value of the linear motor 4.

In order to make the online correction, the measured non-linear spring characteristic was approximated to the friction force f (x') indicated by equation (9).

$$f(x')=fc(1-\exp(-x'/L)) \text{ if } v(t) \geq 0$$

$$f(x')=-fc(1-\exp(x'/L)) \text{ if } v(t)<0 \quad (9)$$

In FIG. 31, a solid line indicates an actually measured non-linear spring characteristic (friction force), and a broken line an approximate equation. The amplitude is 1 mm, and the frequency is 0.1 Hz. In the approximate equation, fc is 38 and L is 22000. The measured non-linear spring characteristic substantially agreed with the approximate equation.

Next, the deviation d was calculated from equations (10) and (11). The calculated deviation d was compared with an actual deviation.

$$\delta(x')=fc(1-\exp(-x'/L))/(Kp \cdot Kv \cdot M) \text{ if } v(t) \geq 0$$

$$\delta(x')=-fc(1-\exp(x'/L))/(Kp \cdot Kv \cdot M) \text{ if } v(t)<0 \quad (10)$$

$$d=Ti \cdot d\delta(x')/dt=Ti \cdot v(t) \cdot d\delta(x')/dx'=fc \cdot Ti \cdot v(t) \cdot (\exp(-x'/L))/(L \cdot Kp \cdot Kv \cdot M) \quad (11)$$

Figure 32:
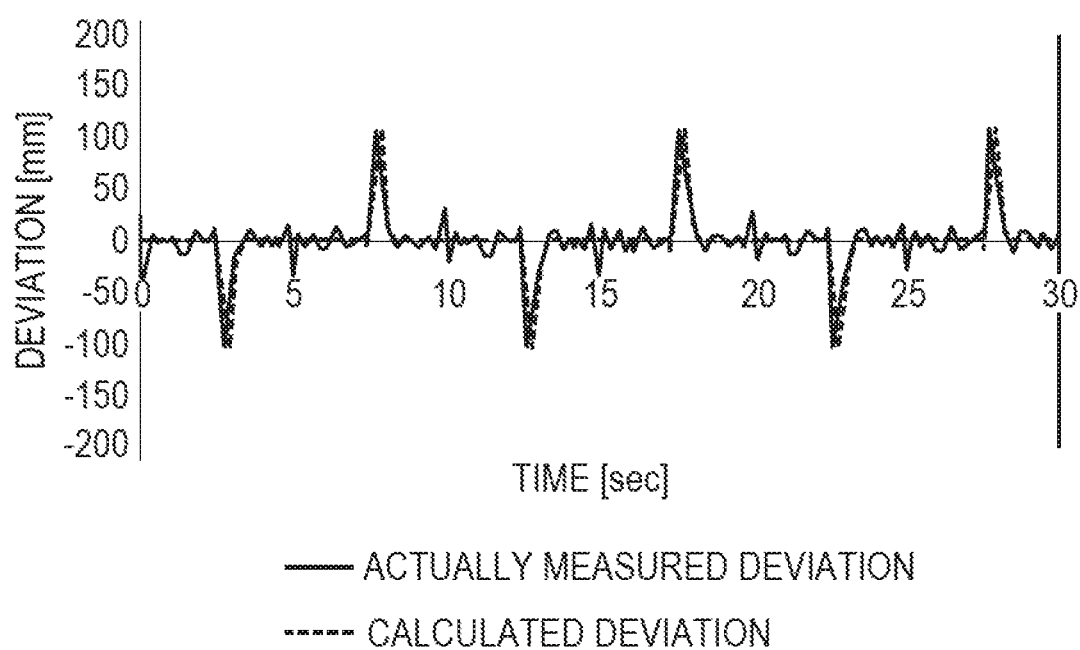
FIG. 32 is a graph illustrating deviations.

FIG. 32 illustrates a result of a comparison between the actually measured deviation and the calculated deviation d. In FIG. 32, a solid line indicates the actual deviation, and a broken line the calculated deviation d. As illustrated in FIG. 32, the actual deviation substantially agreed with the calculated deviation d.

Figure 33:
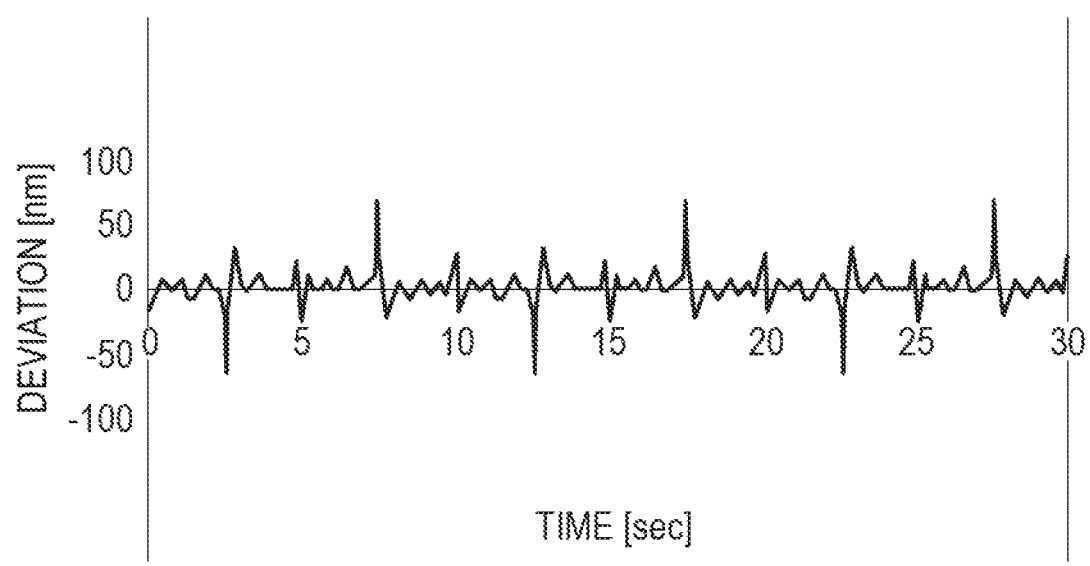
FIG. 33 is a graph illustrating the deviation after online correction.

The online correction in which the calculated deviation d is subtracted from the position command was made. FIG. 33 illustrates the deviation after the online correction. As illustrated in FIG. 33, the deviation could be reduced by the online correction. It was found that the online correction method of the embodiment is effective.

Figure 34:
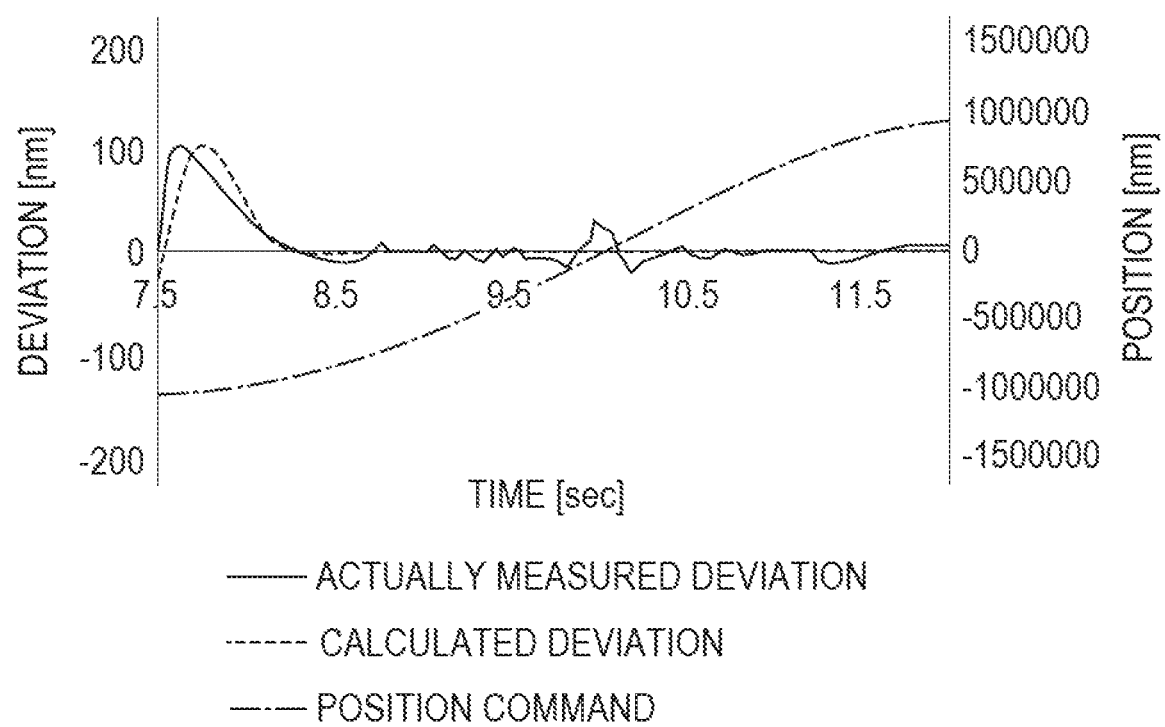
FIG. 34 is a graph comparing an actually measured deviation and a calculated deviation.

However, a slight deviation of the order of nm still remained even after the online correction. The reason that a slight deviation remained is because a slight discrepancy between the actual deviation and the calculated deviation d, which are illustrated in FIG. 34, was generated immediately after the operating direction was reversed. The actual deviation immediately after the operating direction was reversed is steeper than the calculated deviation d. FIG. 34 illustrates an enlarged view of FIG. 32 after the operating direction was reversed (an enlarged view of FIG. 32 from 7.5 sec to 12 sec on the horizontal axis). In FIG. 34, a solid line indicates the actual deviation, and a broken line the calculated deviation d.

A method in which the calculated d is corrected only immediately after the table 1 reverses direction, and a method in which δ(x') expressed by equation (10) is more accurately approximated are conceivable as a method for causing the actual deviation and the calculated deviation d of FIG. 34 to agree with each other.

<Method in which Calculated d is Corrected Only Immediately after Table 1 Reverses Direction>

Figure 35:
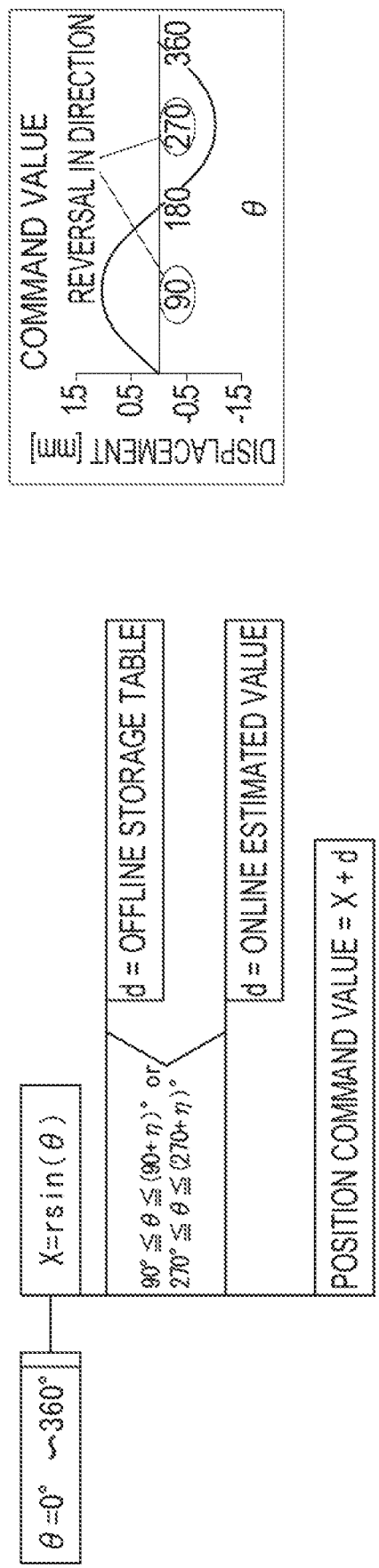
FIG. 35 is a flowchart explaining a deviation correction method.

FIG. 35 illustrates a flowchart of the method in which the calculated d is corrected only immediately after the table 1 reverses direction. It is assumed here that the table 1 describes a circle with a radius r, and the table 1 reverses direction when θ=90° and 270°. Only immediately after the table 1 reverses direction (90°≤θ≤90+η° or 270°≤θ≤270+η°), an offline storage table is read out to set d at a value stored in the offline storage table. Other than the above, d is set at the calculated d (the online estimated value). Consequently, the actual deviation and the calculated deviation d can be caused to agree with each other. This correction method is similar to the offline data table correction method illustrated in FIG. 11. However, a correction is made only immediately after the table 1 reverses direction. Accordingly, there is an effect that the data amount can be reduced.

It is also possible to store a difference between the actual deviation and the calculated deviation d in the offline storage table, and adds the difference to the calculated deviation d only immediately after the table 1 reverses direction. Moreover, it is also possible to calculate d from a mathematical equation different from the mathematical equation of the online estimated value only immediately after the table 1 reverses direction, instead of reading the offline storage table.

<Method in which δ(x') Expressed by Equation (10) is More Accurately Approximated>

Approximating δ(x') expressed by equation (10) by equation (18) is conceivable as the method in which δ(x') is more accurately approximated.

$$\delta(x') = \sum_{i=1}^{n} \delta_i (1 - \exp(-x'/L_i)) \quad (18)$$

When the linear ball guide 2 includes a retainer, n≤3.

In addition, it is conceivable to approximate δ(x') by equation 19).

$$\delta(x') = \sum_{i=1}^{n} \delta_i(x') \quad (19)$$

Here, $$\delta_i(x') = \begin{cases} 0 & \text{if } x < \Delta_i \\ \delta_i (1 - \exp(-(x' - \Delta_i)/L_i)) & \text{if } x' \geq \Delta_i \end{cases}$$

$\Delta_{i-1} < \Delta_i$ and $L_{i-1} < L_i$ $$\delta_1(x') = \delta_1 (1 - \exp(-x'/L_1))$$

When the linear ball guide 2 includes a retainer, n≤3.

The d calculated immediately after reversal can be further approximated to the actually measured d by using equations (18) and (19) that superpose δ(x').

Example 2

Deviations generated when the balls 3 of the linear ball guide 2 are held in a chain by a retainer (in a case with a retainer) and when the balls 3 are not held by a retainer (in a case without a retainer) were compared.

Figure 36A:
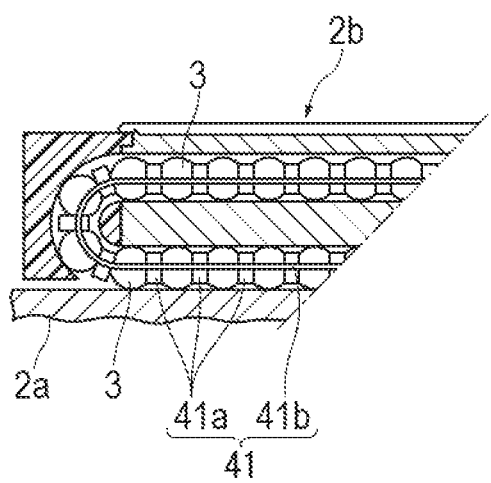
FIG. 36A is a cross-sectional view of a linear ball guide with a retainer.
Figure 36B:
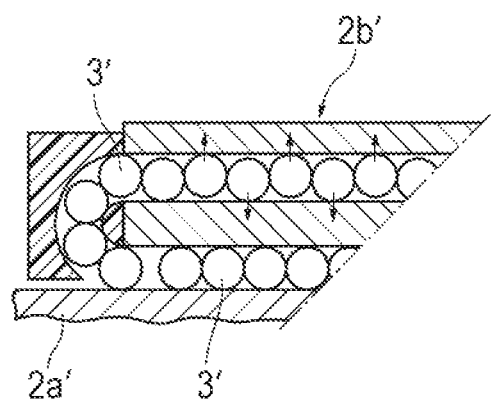
FIG. 36B is a cross-sectional view of a linear ball guide without a retainer.

FIG. 36A illustrates the linear ball guide 2 with a retainer. FIG. 36B illustrates a linear ball guide 2' without a retainer. As illustrated in FIG. 36A, a retainer 41 includes a plurality of spacers 41a interposed between the plurality of balls 3, and a flexible band 41b that connects the plurality of spacers 41a in a chain.

As illustrated in FIG. 36B, without a retainer a free ball 3' is pushed by a ball behind it. Therefore, the free ball 3' snakes due to irregularities in the spacing of the balls 3' caused by the ball 3' entering a loaded area.

In contrast, as illustrated in FIG. 36A, with a retainer the revolution force of the ball 3 that is rolling in the loaded area moves the free ball 3 via the retainer 41. Hence, the ball 3 does not snake, and irregularities in the spacing of the balls 3 do not occur, either.

Figure 37A:
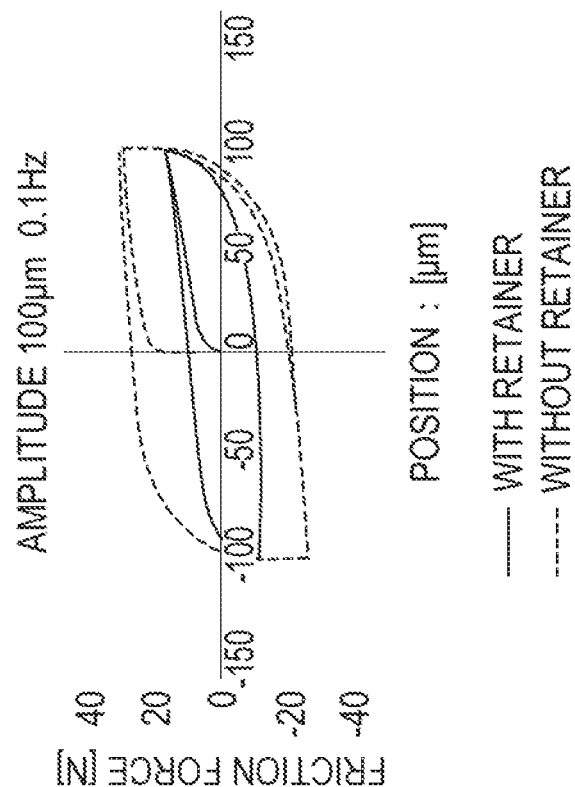
FIGS. 37A and 37B are graphs comparing measured non-linear spring characteristics in cases with and without a retainer (FIG. 37A is in a case where the amplitude is 1 μm and the frequency is 0.1 Hz, and FIG. 37B is in a case where the amplitude is 100 μm and the frequency is 0.1 Hz).
Figure 37B:
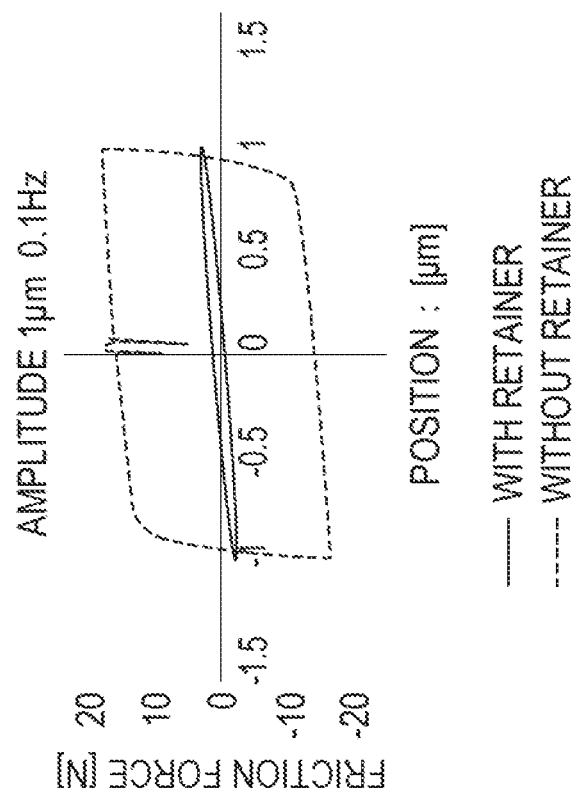

FIGS. 37A and 37B are graphs in which the measured non-linear spring characteristics in the cases with and without a retainer were compared. In FIG. 37A, the amplitude is 1 μm, and the frequency is 0.1 Hz. In FIG. 37B, the amplitude is 100 μm, and the frequency is 0.1 Hz. As can be seen from FIGS. 37A and 37B that without a retainer, the friction force is large and the derivative is steep at the start of moving or at the time of reversing direction. This is considered to be because a static friction force acts due to the contact between the balls 3'.

Next, the position command of the table 1 was corrected by using the offline data table correction method in the cases with and without a retainer. In other words, the table 1 was moved first without making a correction. A deviation at this point in time was stored in memory. A position command obtained by subtracting the stored deviation from the position command then moved the table 1.

Figure 38:
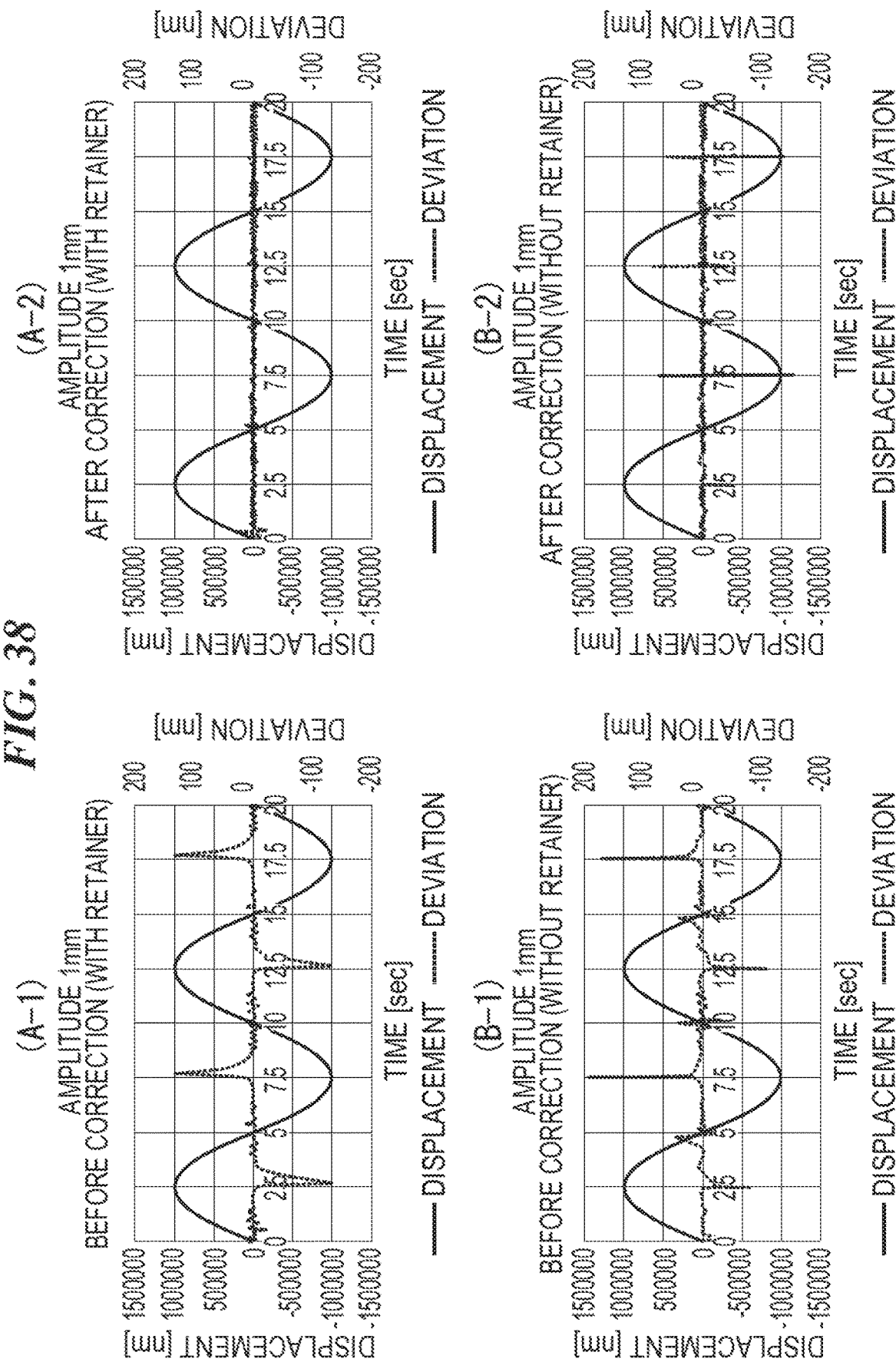
FIGS. 38(A-1) to 38(B-2) are graphs illustrating results of the correction of a positional deviation using an offline data table correction method in cases with and without a retainer (FIGS. 38(A-1) and (A-2) are in the case with a retainer, and FIGS. 38(B-1) and (B-2) are in the case without a retainer).

FIG. 38(A-1) illustrates the deviation before correction (the deviation stored in memory) in the case with a retainer. FIG. 38(A-2) illustrates the deviation after correction in the case with a retainer. As illustrated in FIG. 38(A-2), the deviation could be substantially completely cleared in the case with a retainer.

FIG. 38(B-1) illustrates the deviation before correction (the deviation stored in memory) in the case without a retainer. FIG. 38(B-2) illustrates the deviation after correction in the case without a retainer. As illustrated in FIG. 38(B-2), in the case without a retainer, a phenomenon was observed in which the deviation could not be completely corrected at peaks. This indicates that a time difference and a magnitude difference occur in the friction force generated by the contact between the free balls 3' that are not held by the retainer 41, according to the operation of the table 1. It was found that the retainer 41 is very effective to clear the deviation caused by the friction force of the linear ball guide 2.

The present invention is not limited to the realization of the embodiments, and can be modified to various embodiments within the scope that does not change the gist of the present invention.

For example, the example in which the position control apparatus of the embodiments is used in a stage has been described in the embodiments. However, the position control apparatus of the embodiments is not limited to the stage, but can be applied to machines that require positioning, for example, semiconductor manufacturing apparatuses such as exposure apparatuses, liquid crystal manufacturing apparatuses, machine tools such as machining centers, injection molding machines, precision processing machines, measurement apparatuses, analysis apparatuses, testing apparatuses, industrial robots, consumer robots, rockets, and ships. Deviation caused by a rolling guide apparatus integrated in a machine can be reduced or eliminated; accordingly, positioning accuracy is increased.

The example in which the linear ball guide is used as the rolling apparatus has been described in the first embodiment. However, it is also possible to use a linear roller guide or the like, or a rotary bearing or the like, instead of the linear ball guide. If a rotary bearing is used, indexing of a table can be made.

The example in which the deviation e(t) is subtracted from the position command Xref, and the deviation d^ is added to the position command r has been described in the first embodiment. The only difference is in setting the disturbance to plus or minus. Conversely, it is also possible to add the deviation e(t) to the position command Xref, and subtract the estimated value (deviation) d^ of the displacement disturbance from the position command r.

The example in which the table is moved along a circular path has been described in the first and second embodiments. However, the table can also be moved along a straight path.

The present description is based on Japanese Patent Application No. 2015-155719 filed on Aug. 6, 2015, Japanese Patent Application No. 2016-009483 filed on Jan. 21, 2016, Japanese Patent Application No. 2016-048577 filed on Mar. 11, 2016, and Japanese Patent Application No. 2016-116365 filed on Jun. 10, 2016, the entire contents of which are incorporated herein.

REFERENCE SIGNS LIST

1 Table (movable body)
2 Linear ball guide (rolling apparatus, rolling guide apparatus)
2a Rail
2b Guide block
3 Ball (rolling element)
4 Linear motor
5 Computer (position control apparatus, storage device)
6 Amplifier (position control apparatus)
9, 21 Stage (positioning apparatus)
24 Motor
26 Screw shaft (ball screw, rolling apparatus)
27 Nut (ball screw, rolling apparatus)
31 Table position controller (position control apparatus)
32 Motor controller (position control apparatus)
35 Correction circuit (position control apparatus)
36 Deformation amount computation table (position control apparatus)
Xref, r Position command of the table (movable body)
$\delta(x)$ Deformation caused by the non-linear spring characteristic of the linear ball guide (rolling apparatus) or ball screw (rolling apparatus)
e(t) Deviation caused by the non-linear spring characteristic of the linear ball guide (rolling apparatus) or ball screw (rolling apparatus)
d Deviation caused by the non-linear spring characteristic of the linear ball guide (rolling apparatus) or ball screw (rolling apparatus)
f Friction force of the linear ball guide (rolling apparatus)
τ Friction torque of the ball screw (rolling apparatus)

The invention claimed is:

1. A position control apparatus that controls the position of a movable body, in a positioning apparatus including a rolling apparatus, wherein
   a deviation of the movable body caused by a non-linear spring characteristic of the rolling apparatus is subtracted from or added to a position command of the movable body,
   the deviation is calculated by carrying out equivalent exchange on a control circuit for a friction force of the rolling apparatus, which is set as a quantity of the dimension of displacement,
   the rolling apparatus includes a rolling guide apparatus that guides the movable body,
   the positioning apparatus includes a linear motor that drives the movable body,
   the position control apparatus uses a Proportional-Integral (PI) controller for speed control, and
   the deviation d is calculated from the following equation (11):

$$d = Ti \cdot v(t) \cdot d\delta(x')/dx' \qquad (11)$$

where $\delta \cdot (x) = f(x')/(Kp \cdot Kv \cdot M)$, x' is the position of the movable body having an origin at a point where the velocity is reversed, f(x') is the friction force of the rolling guide apparatus expressed in a function of x', Ti is the integral time, v(t) is the velocity of the movable body, Kp is the position loop proportional gain, Kv is the velocity loop proportional gain, Ti is the integral time, and M is the mass of the movable body.

2. A position control apparatus that controls the position of a movable body, in a positioning apparatus including a rolling apparatus, wherein
   a deviation of the movable body caused by a non-linear spring characteristic of the rolling apparatus is subtracted from or added to a position command of the movable body,
   the deviation is calculated by carrying out equivalent exchange on a control circuit for a friction force of the rolling apparatus, which is set as a quantity of the dimension of displacement,
   the rolling apparatus includes a rolling guide apparatus that guides the movable body,
   the positioning apparatus includes a linear motor that drives the movable body,
   the position control apparatus uses a Proportional (P) controller for speed control, and
   the deviation d is calculated from the following equation (12):

$$d = \delta(x') \qquad (12)$$

where $\delta(x') = f(x')/(Kp \cdot Kv \cdot M)$, and x' is the position of the movable body having an origin at a point where the velocity is reversed, f(x') is the friction force of the rolling guide apparatus expressed in a function of x', Ti is the integral time, v(t) is the velocity of the movable body, Kp is the position loop proportional gain, Kv is the velocity loop proportional gain, Ti is the integral time, and M is the mass of the movable body.

3. The position control apparatus according to claim 1, wherein the friction force f(x') is calculated from the following equation (9):

$$f(x')=fc(1-\exp(-x'/L)) \text{ if } v(t) \geq 0$$

$$f(x')=-fc(1-\exp(x'/L)) \text{ if } v(t) < 0 \tag{9}$$

where fc is the constant representing the magnitude of the friction force, and L is the constant representing the steepness of the friction force.

4. The position control apparatus according to claim 1, wherein the deviation d is corrected only immediately after the velocity of the movable body is reversed.

5. A position control apparatus that controls the position of a movable body, in a positioning apparatus including a rolling apparatus, wherein
   a deviation of the movable body caused by a non-linear spring characteristic of the rolling apparatus is subtracted from or added to a position command of the movable body,
   the deviation is calculated by carrying out equivalent exchange on a control circuit for a friction force of the rolling apparatus, which is set as a quantity of the dimension of displacement,
   the rolling apparatus includes a ball screw that drives the movable body,
   the position control apparatus uses a Proportional-Integral (PI) controller for speed control, and
   the deviation d is calculated from the following equation (16):

$$d = \tau \cdot \frac{1}{Kp} \cdot \frac{L}{2\pi} \cdot \frac{s}{Kv \cdot s + Ki} \cdot \frac{1}{J} \tag{16}$$

where τ is the friction torque of the ball screw, Kp is the position loop proportional gain, L is the lead of the ball screw, Kv is the angular velocity proportional gain, Ki is the angular velocity integral gain, J is the load inertia, and s is the Laplace operator.

6. A position control apparatus that controls the position of a movable body, in a positioning apparatus including a rolling apparatus, wherein
   a deviation of the movable body caused by a non-linear spring characteristic of the rolling apparatus is subtracted from or added to a position command of the movable body,
   the deviation is calculated by carrying out equivalent exchange on a control circuit for a friction force of the rolling apparatus, which is set as a quantity of the dimension of displacement,
   the rolling apparatus includes a ball screw that drives the movable body,
   the position control apparatus uses a Proportional (P) controller for speed control, and
   the deviation d is calculated from the following equation (17):

$$d = \tau \cdot \frac{1}{Kp} \cdot \frac{L}{2\pi} \cdot \frac{1}{Kv} \cdot \frac{1}{J} \tag{17}$$

where τ is the friction torque of the ball screw, Kp is the position loop proportional gain, L is the lead of the ball screw, Kv is the angular velocity proportional gain, Ki is the angular velocity integral gain, J is the load inertia, and s is the Laplace operator.

7. The position control apparatus according to claim 1, wherein the position control apparatus is used for contour control that moves the movable body in at least two axis directions, X and Y.

8. The position control apparatus according to claim 1, wherein
   a plurality of rolling elements of the rolling apparatus is held in a chain by a retainer, and
   the retainer includes a plurality of spacers interposed between the plurality of rolling elements, and a flexible band that connects the plurality of spacers in a chain.

9. The position control apparatus according to claim 2, wherein
   the friction force f(x') is calculated from the following equation (9):

$$f(x')=fc(1-\exp(-x'/L)) \text{ if } v(t) \geq 0$$

$$f(x')=-fc(1-\exp(x'/L)) \text{ if } v(t) < 0 \tag{9}$$

where fc is the constant representing the magnitude of the friction force, and L is the constant representing the steepness of the friction force.

10. The position control apparatus according to claim 2, wherein the deviation d is corrected only immediately after the velocity of the movable body is reversed.

11. The position control apparatus according to claim 3, wherein the deviation d is corrected only immediately after the velocity of the movable body is reversed.

12. The position control apparatus according to claim 2, wherein
    a plurality of rolling elements of the rolling apparatus is held in a chain by a retainer, and
    the retainer includes a plurality of spacers interposed between the plurality of rolling elements, and a flexible band that connects the plurality of spacers in a chain.

13. The position control apparatus according to claim 5, wherein
    a plurality of rolling elements of the rolling apparatus is held in a chain by a retainer, and
    the retainer includes a plurality of spacers interposed between the plurality of rolling elements, and a flexible band that connects the plurality of spacers in a chain.

14. The position control apparatus according to claim 6, wherein
    a plurality of rolling elements of the rolling apparatus is held in a chain by a retainer, and
    the retainer includes a plurality of spacers interposed between the plurality of rolling elements, and a flexible band that connects the plurality of spacers in a chain.

15. The position control apparatus according to claim 2, wherein the position control apparatus is used for contour control that moves the movable body in at least two axis directions, X and Y.

16. The position control apparatus according to claim 5, wherein the friction force f(x') is calculated from the following equation (9):

$$f(x')=fc(1-\exp(-x'/L)) \text{ if } v(t) \geq 0$$

$$f(x')=-fc(1-\exp(x'/L)) \text{ if } v(t) < 0 \tag{9}$$

where fc is the constant representing the magnitude of the friction force, and L is the constant representing the steepness of the friction force.

17. The position control apparatus according to claim 5, wherein the deviation d is corrected only immediately after the velocity of the movable body is reversed.

18. The position control apparatus according to claim 5, wherein the position control apparatus is used for contour control that moves the movable body in at least two axis directions, X and Y.

19. The position control apparatus according to claim 6, wherein the friction force f(x') is calculated from the following equation (9):

$$f(x') = fc(1-\exp(-x'/L)) \text{ if } v(t) \geq 0$$

$$f(x') = -fc(1-\exp(x'/L)) \text{ if } v(t) < 0 \qquad (9)$$

where fc is the constant representing the magnitude of the friction force, and L is the constant representing the steepness of the friction force.

20. The position control apparatus according to claim 6, wherein the deviation d is corrected only immediately after the velocity of the movable body is reversed.

* * * * *